(12) United States Patent
Moriyama et al.

(10) Patent No.: US 12,110,927 B2
(45) Date of Patent: Oct. 8, 2024

(54) TORQUE TRANSMISSION SHAFT

(71) Applicant: NSK Ltd., Tokyo (JP)

(72) Inventors: Seiichi Moriyama, Maebashi (JP); Keisuke Nakao, Maebashi (JP)

(73) Assignee: NSK Ltd., Tokyo (JP)

( * ) Notice: Subject to any disclaimer, the term of this patent is extended or adjusted under 35 U.S.C. 154(b) by 466 days.

(21) Appl. No.: 17/425,163

(22) PCT Filed: Jan. 22, 2020

(86) PCT No.: PCT/JP2020/002151
§ 371 (c)(1),
(2) Date: Jul. 22, 2021

(87) PCT Pub. No.: WO2020/153408
PCT Pub. Date: Jul. 30, 2020

(65) Prior Publication Data
US 2022/0120319 A1    Apr. 21, 2022

(30) Foreign Application Priority Data

Jan. 23, 2019   (JP) ................................ 2019-009011

(51) Int. Cl.
| | | |
|---|---|---|
| *F16D 1/08* | (2006.01) | |
| *F16D 1/068* | (2006.01) | |
| *F16D 1/072* | (2006.01) | |

(52) U.S. Cl.
CPC ........... *F16D 1/0864* (2013.01); *F16D 1/068* (2013.01); *F16D 1/072* (2013.01)

(58) Field of Classification Search
CPC .......... F16B 2/065; F16B 7/048; F16D 1/068; F16D 1/072; F16D 1/0864; F16D 3/387;
(Continued)

(56) References Cited

U.S. PATENT DOCUMENTS 3,814,528 A * 6/1974 Duer ..................... F16D 1/0864
403/256
7,930,826 B2    4/2011 Inoue et al.
(Continued)

FOREIGN PATENT DOCUMENTS

| JP | 48-3248 B1 | 1/1973 |
|---|---|---|
| JP | 2005-180698 A | 7/2005 |

(Continued)

OTHER PUBLICATIONS

International Search Report (PCT/ISA/210) issued in PCT Application No. PCT/JP2020/002151 dated Apr. 7, 2020 with English translation (four (4) pages).

(Continued)

*Primary Examiner* — Josh Skroupa
(74) *Attorney, Agent, or Firm* — Crowell & Moring LLP

(57) ABSTRACT

A torque transmission shaft includes a shaft and a clamp. The shaft includes: a male serration in one axial end portion; a slit in the other axial end portion, the slit axially extending and having a closed end on one side and an open end on the other side; a fitting cylinder portion in the other axial end portion; and a female serration provided in of the other axial end portion. The clamp includes: a discontinuous portion arranged at one place in the circumferential direction; a pair of flange portions arranged on both sides of the discontinuous portion; a connecting portion connecting the flange portions; and an insertion hole for fitting cylinder portion. The clamp is fitted onto the fitting cylinder portion to reduce the diameter of the fitting cylinder portion by narrowing the width dimension of the discontinuous portion.

18 Claims, 30 Drawing Sheets

(58) Field of Classification Search
CPC ..... F16D 2250/0023; F16D 2250/0076; Y10T 403/4614; Y10T 403/4617; Y10T 403/535; Y10T 403/7182; Y10T 403/7188
USPC .................. 403/230, 235, 290, 398, 399
See application file for complete search history.

(56) References Cited

U.S. PATENT DOCUMENTS

| | | | |
|---|---|---|---|
| 11,035,414 B2* | 6/2021 | Moriyama | ............ F16D 1/0864 |
| 2005/0140130 A1 | 6/2005 | Laisement et al. | |
| 2022/0010841 A1* | 1/2022 | Moriyama | .............. F16D 3/387 |

FOREIGN PATENT DOCUMENTS

| | | | | |
|---|---|---|---|---|
| JP | 2006-84005 A | | 3/2006 | |
| JP | 2006084005 | * | 3/2006 | ............... F16D 1/08 |
| JP | 2008-126296 A | | 6/2008 | |
| JP | 2011-220398 A | | 11/2011 | |
| JP | 2017-25964 A | | 2/2017 | |

OTHER PUBLICATIONS

Japanese-language Written Opinion (PCT/ISA/237) issued in PCT Application No. PCT/JP2020/002151 dated Apr. 7, 2020 (four (4) pages).

* cited by examiner (A)

(B)

TORQUE TRANSMISSION SHAFT

TECHNICAL FIELD

The present invention relates to a torque transmission shaft assembled in an automobile steering apparatus or the like.

BACKGROUND ART

FIG. 28 illustrates a conventional example of a steering apparatus for automobile as described in JP 2017-025964A. The steering apparatus includes a steering wheel 1, a steering shaft 2, a steering column 3, a pair of universal joints 4a, 4b, an intermediate shaft 5, a steering gear unit 6, and a pair of tie rods 7.

The steering wheel 1 is attached to the rear end portion of the steering shaft 2 that is rotatably supported inside the steering column 3. The front-end portion of the steering shaft 2 is connected to the pinion shaft 8 of the steering gear unit 6 via the pair of universal joints 4a, 4b and the intermediate shaft 5. By converting the rotation of the pinion shaft 8 into linear motion of a rack (not illustrated), the pair of tie rods 7 are pushed and pulled, and the steered wheels are given a steering angle according to the amount of operation of the steering wheel 1. Note that the front-rear direction means the front-rear direction of the vehicle body to which the steering apparatus is assembled.

The universal joints 4a, 4b are rotating shafts that do not exist on the same straight line with each other, and connect between the steering shaft 2 and the intermediate shaft 5 and between the intermediate shaft 5 and the pinion shaft 8 so as to be able to transmit torque to each other. As the universal joints 4a, 4b, a cross-axis type universal joint having a pair of yokes and a cross shaft described in JP 2011-220398A and the like is used.

Incidentally, in a steering apparatus mounted in a large automobile, the distance from the steering shaft to the steering gear unit becomes long. Therefore, it is considered that shafts such as the steering shaft, pinion shaft, and the like are not directly fixed to the yoke of the universal joint, but are fixed via a torque transmission shaft, which is also called an extension shaft.

FIG. 29 and FIG. 30 illustrate a torque transmission shaft 9 described in JP 2008-126296A. The torque transmission shaft 9 is arranged between the universal joint 4c connected to the intermediate shaft 5a and the pinion shaft 8a, and connects the universal joint 4c and the pinion shaft 8a so that torque can be transmitted. Moreover, the torque transmission shaft 9 has a male serration 10 on the outer circumferential surface of one end portion in the axial direction and a non-circular hole 11 on the inner circumferential surface of the other end portion in the axial direction. The other end portion in the axial direction of the torque transmission shaft 9 is integrally provided with a clamp portion 12 for reducing the diameter of the other end portion in the axial direction of the torque transmission shaft 9.

The one end portion in the axial direction of the torque transmission shaft 9 is inserted inside a yoke 13 of the universal joint 4c, and the male serration 10 engages with a female serration 14 formed on the inner circumferential surface of the yoke 13 with a serration engagement.

A non-circular shaft portion 15 that is formed at one end portion in the axial direction of the pinion shaft 8a is inserted inside the non-circular hole 11 of the torque transmission shaft 9, and the non-circular hole 11 and the non-circular shaft portion 15 engage so as to not be able to rotate relative to each other. The inner circumferential surface of the non-circular hole 11 is strongly pressed against the outer circumferential surface of the non-circular shaft portion 15 by reducing the diameter of the other end portion in the axial direction of the torque transmission shaft 9 by the clamp portion 12.

CITATION LIST

Patent Literature

Patent Literature 1: JP 2017-025964A
Patent Literature 2: JP 2011-220398A
Patent Literature 3: JP 2008-126296 A

SUMMARY OF THE INVENTION

Technical Problem

The torque transmission shaft 9 illustrated in FIGS. 29 and 30 is often manufactured by cold forging, and is superior in shape precision and dimensional precision as compared with the case where it is manufactured by hot forging. However, due to a fact such that the other end portion in the axial direction of the torque transmission shaft 9 is integrally provided with a clamp portion 12 that complicates the flow of the metal material, it becomes difficult to secure a high degree of coaxiality between the male serration 10 and the non-circular hole 11 which are provided on both side potions in the axial direction of the torque transmission shaft 9. Therefore, there is a possibility that whirling of the intermediate shaft 5a or the pinion shaft 8a which are connected to the torque transmission shaft 9 via the universal joint 4c or directly may increase. As a result, there is a possibility that a part of the steering apparatus may generate abnormal noise such as a sliding noise in the rotation direction, stick-slip vibration noise or the like due to whirling of the shaft.

In view of the circumstances described above, an object of the present invention is to provide a torque transmission shaft having a structure capable of suppressing whirling of a shaft connected to the torque transmission shaft.

Solution to Problem

The torque transmission shaft of the present invention includes a shaft and a clamp that is separate from the shaft.

The shaft has a hollow cylindrical shape and includes: a male serration provided on an outer circumferential surface of one end portion in an axial direction; a slit provided in the other end portion in the axial direction, extending in the axial direction, and having a closed end on one side in the axial direction and an open end on the other side in the axial direction; a fitting cylinder portion provided in the other end in the axial direction, and a female serration provided on an inner circumferential surface of the other end portion in the axial direction.

The clamp has an incomplete cylindrical shape and includes: a discontinuous portion arranged at one place in a circumferential direction, a pair of flange portions arranged on both sides in the circumferential direction of the discontinuous portion and having mounting holes into which a tightening member can be inserted, a connecting portion that has a partially cylindrical shape and connects the pair of flange portions in the circumferential direction, and an insertion hole into which the fitting cylinder portion is inserted.

The clamp is externally fitted onto the fitting cylinder portion and is able to reduce the diameter of the fitting cylinder portion by narrowing a width dimension of the discontinuous portion.

In the present invention, the positions in the circumferential direction of the slit and the discontinuous portion can coincide with each other.

In one form of the present invention, the shaft and the clamp are welded and fixed together. In this case, for example, the portion between the edge of the opening of the insertion hole of the clamp and the outer circumferential surface of the shaft is spot-welded.

In an alternative form of the present invention, the shaft and the clamp are fixed together by a plastically deformed portion formed on at least one of the shaft and the clamp. In this case, for example, a shaft-side engaging portion composed of a ridge or a groove extending in the axial direction is provided on the outer circumferential surface of the shaft, a clamp-side engaging portion composed of a concave groove or a ridge extending in the axial direction is provided on the inner circumferential surface of the insertion hole, the shaft-side engaging portion and the clamp-side engaging portion engage with each other in a concave-convex engagement, and the plastically deformed portion is arranged at a portion of the shaft-side engaging portion adjacent to both sides of the clamp in the axial direction. As the plastically deformed portion, a crimped deformed portion that is obtained by crimping and deforming the portions of the shaft-side engaging portion adjacent to both sides of the clamp in the axial direction can be adopted.

In one form of the present invention, the outer circumferential surface of the fitting cylinder portion and the inner circumferential surface of the insertion hole are fitted together with a non-circular fit so as not to rotate relative to each other. In this case, for example, a flat surface portion (straight line portion) is respectively provided on at least a part in the circumferential direction of the outer circumferential surface of the shaft and at least a part in the circumferential direction of the inner circumferential surface of the insertion hole.

In the torque transmission device of the present invention, the shaft and the clamp are preferably configured so that the amount of deformation that occurs in the fitting cylinder portion in a case where the diameter of the fitting cylinder portion of the clamp is reduced by the clamp is similar between one side portion in the axial direction and the other side portion in the axial direction of the fitting cylinder portion.

In one form of the present invention, the connecting portion includes a notch that is provided on a portion on the other side in the axial direction, and is recessed on the one side in the axial direction from an end surface on the other side in the axial direction of the pair of flange portions. In this case, the notch is preferably located on the other side in the axial direction from the center axis of the mounting holes. The width in the axial direction of the notch becomes larger as going away from the pair of flange portions in the circumferential direction of the connecting portion, or is constant in the circumferential direction of the connecting portion.

In one form of the present invention, in a state before the diameter of the shaft is reduced by the clamp, the outer circumferential surface of the one side portion in the axial direction of the fitting cylinder portion and the inner circumferential surface of the one side portion in the axial direction of the insertion hole are substantially in contact with each other, and there is an annular gap between the outer circumferential surface of the other end portion in the axial direction of the fitting cylinder and the inner circumferential surface of the other end portion in the axial direction of the insertion hole. Alternatively, in a state before the diameter of the shaft is reduced by the clamp, a portion on the one side in the axial direction of the insertion hole of the clamp is composed of a small diameter portion having an inner diameter dimension that is equal to or slightly larger than the outer diameter dimension of the fitting cylinder portion, and the other end portion in the axial direction of the insertion hole of the clamp is composed of a large diameter portion having an inner diameter dimension that is larger than the inner diameter dimension of the one side portion in the axial direction of the insertion hole of the clamp. More specifically, an annular concave groove having an inner diameter dimension that is larger than a portion adjacent to the one side in the axial direction is provided on the inner circumferential surface of the other end portion in the axial direction of the insertion hole. Alternatively, at least the other end portion in the axial direction of the inner circumferential surface of the insertion hole is composed of a tapered surface having an inner diameter dimension that becomes larger as going toward the other side in the axial direction from the one side in the axial direction, and the remaining portion of the inner circumferential surface of the insertion hole is composed of a cylindrical surface. Alternatively, a small diameter portion having an outer diameter dimension that is smaller than a portion adjacent to the other side in the axial direction is provided on the other end portion in the axial direction of the fitting cylinder portion. Alternatively, the outer circumferential surface of at least the other end portion in the axial direction of the outer circumferential surface of the fitting cylinder portion is composed of a tapered surface having an outer diameter dimension that becomes smaller as going toward the other side in the axial direction from the one side in the axial direction, and the remaining portion of the outer circumferential surface of the fitting cylinder portion is composed of a cylindrical surface.

In one form of the present invention, the female serration is provided only on the inner circumferential surface of the fitting cylinder portion, and one end portion in the axial direction of the slit is arranged on the one side in the axial direction from the fitting cylinder portion, and is located at a portion having an outer diameter dimension and an inner diameter dimension larger than the fitting cylinder portion. Preferably, the shaft has a conical cylinder portion provided in a portion adjacent to the one side in the axial direction of the fitting cylinder portion and having an outer diameter dimension and inner diameter dimension that become larger as going toward the one side in the axial direction, and the one end portion in the axial direction of the slit is on the one side in the axial direction from the conical cylinder portion.

In one form of the present invention, the shaft includes: a fitting side engaging concave groove that is provided at a part in the circumferential direction on the outer circumferential surface of the fitting cylinder portion so as to intersect the slit, and so that the tightening member can be arranged therein; and an auxiliary concave groove that is provided at a part in the circumferential direction on the outer circumferential surface of a portion separated to the one side in the axial direction from the fitting cylinder portion so as to intersect the slit. In this case, for example, the fitting side engaging concave groove and the auxiliary concave groove are arranged parallel with each other in portions of which the phases in the circumferential direction coincide. The fitting side engaging concave groove and the auxiliary concave groove can be composed of a broach groove. The fitting side engaging concave groove and the auxiliary concave groove can have a partially cylindrical shape.

Effect of Invention

The present invention provides a torque transmission shaft having a structure capable of effectively suppressing whirling of a shaft connected to the torque transmission shaft.

DESCRIPTION OF EMBODIMENTS

First Example

Figure 1:
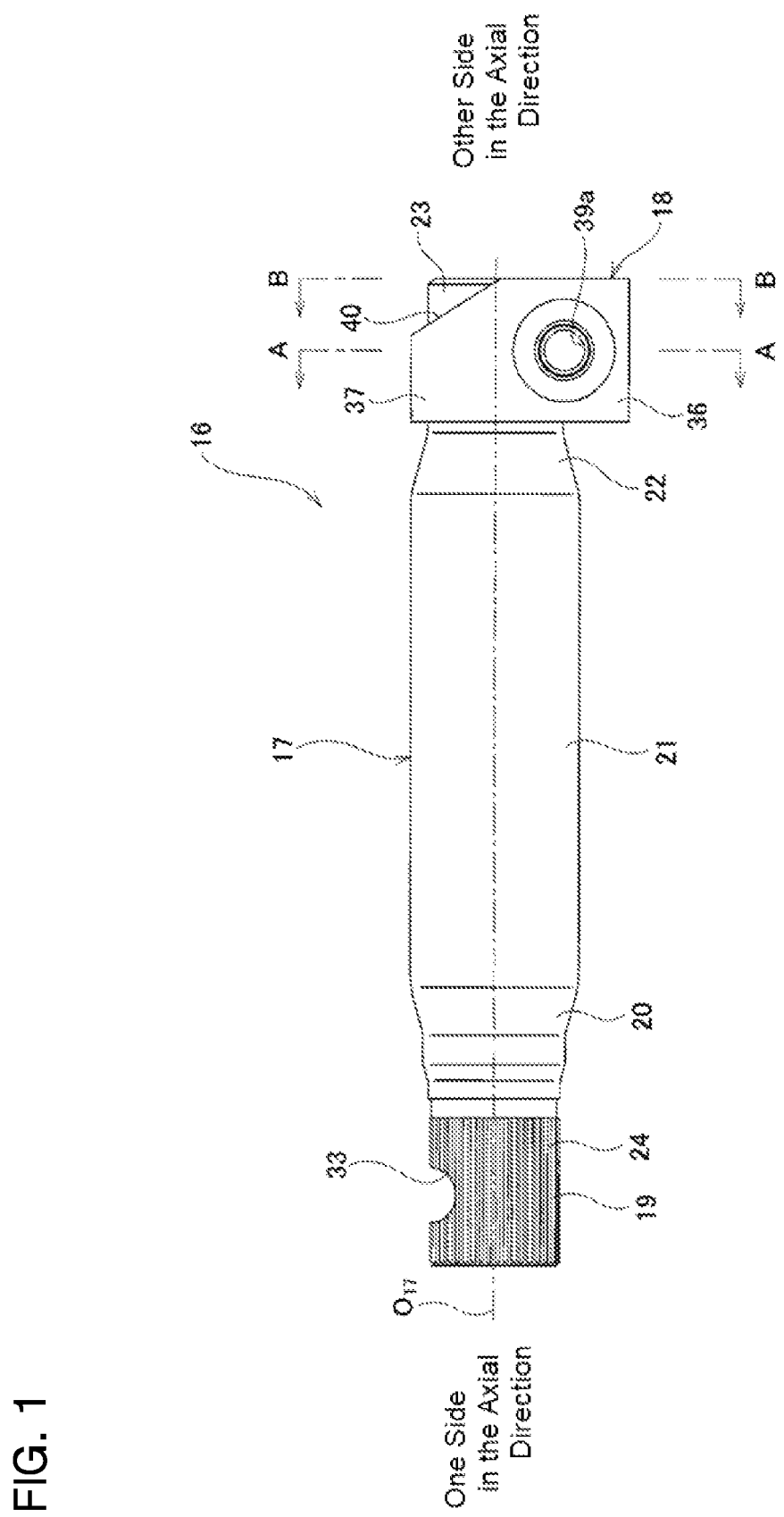
FIG. 1 is a side view of a torque transmission shaft according to a first example of an embodiment of the present invention.
Figure 2:
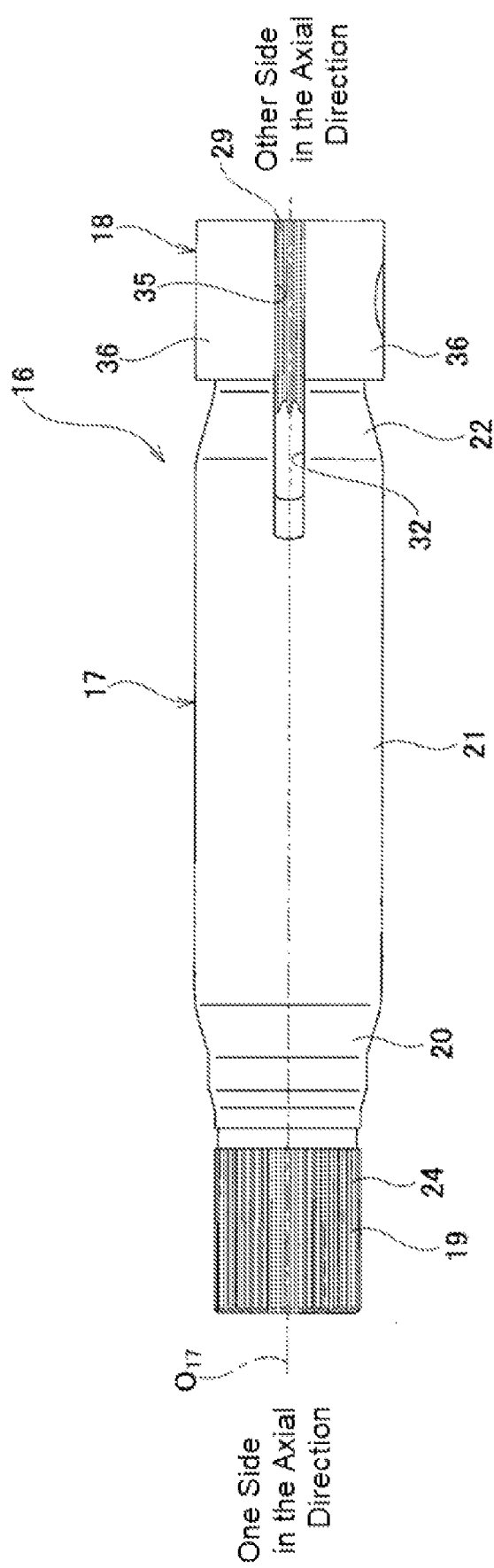
FIG. 2 is a bottom view of the torque transmission shaft according to the first example.
Figure 3:
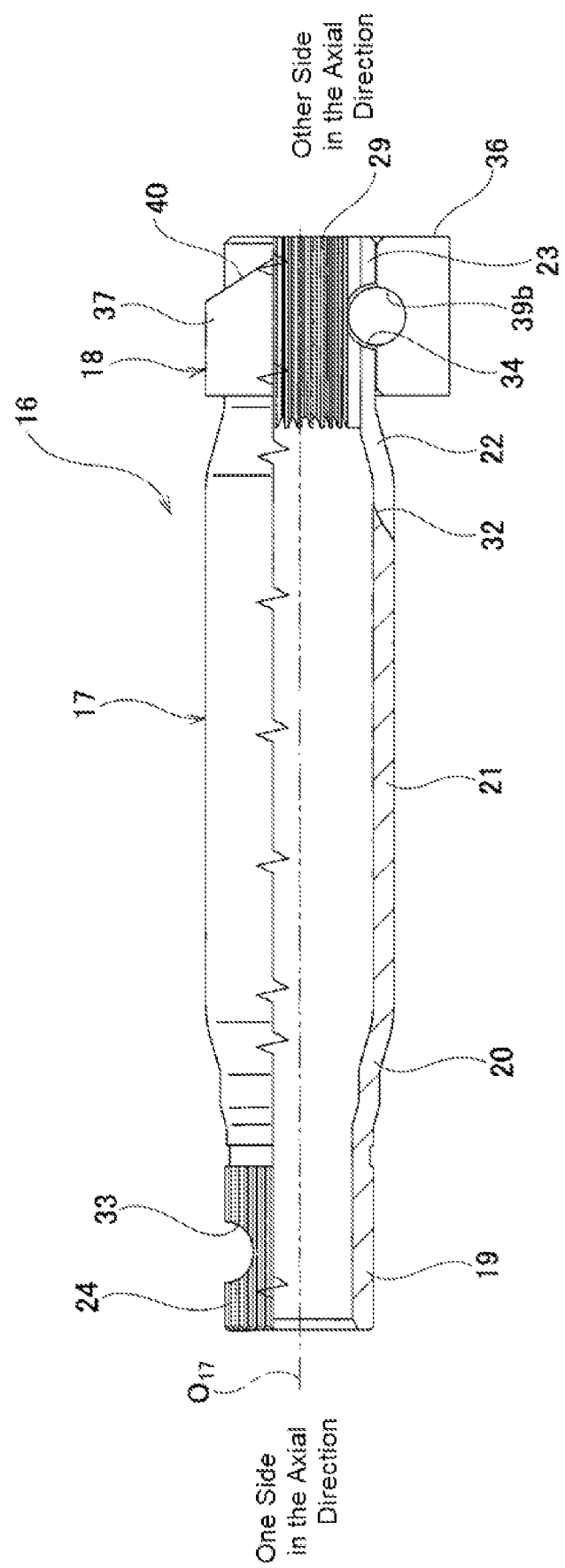
FIG. 3 is a half cross-sectional view of FIG. 1.
Figure 4:
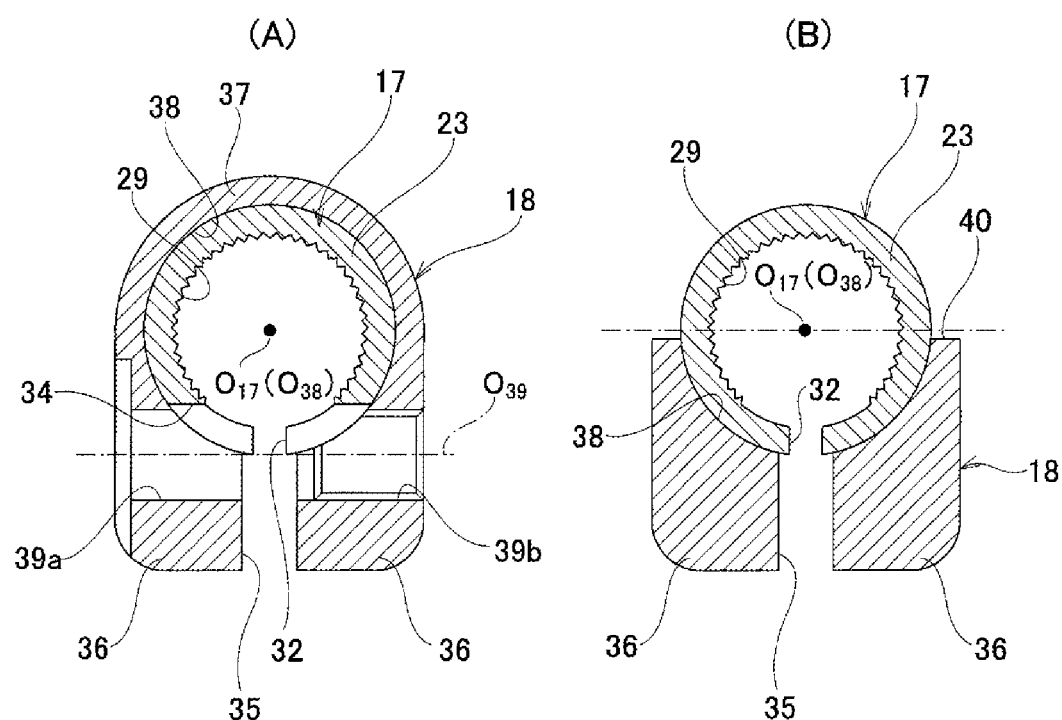
FIG. 4A is a cross-sectional view taken along the line A-A of FIG. 1.
FIG. 4B is a cross-sectional view taken along the line B-B of FIG. 1.
Figure 5:
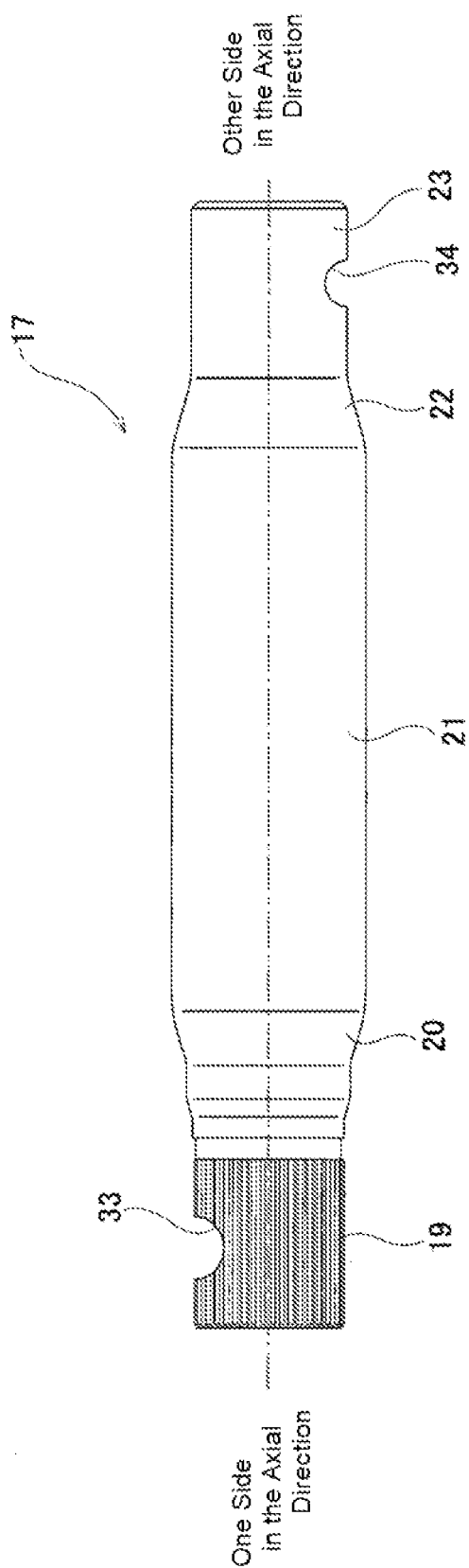
FIG. 5 is a side view of a shaft of the torque transmission shaft according to the first example.
Figure 6:
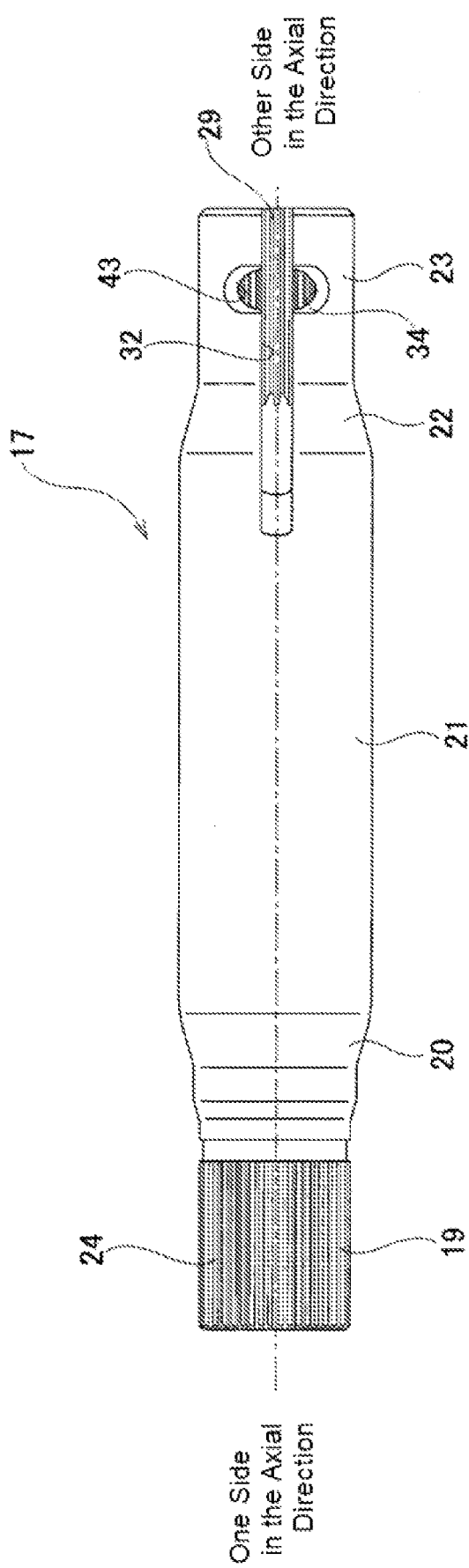
FIG. 6 is a bottom view of the shaft of the torque transmission shaft according to the first example.
Figure 7:
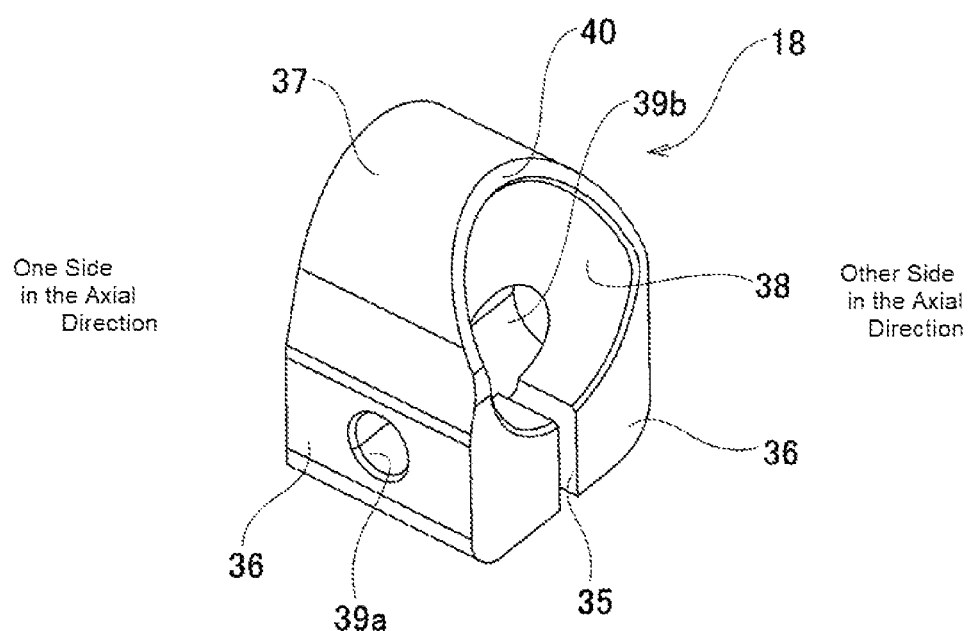
FIG. 7 is a perspective view of a clamp of the torque transmission shaft according to the first example.
Figure 8:
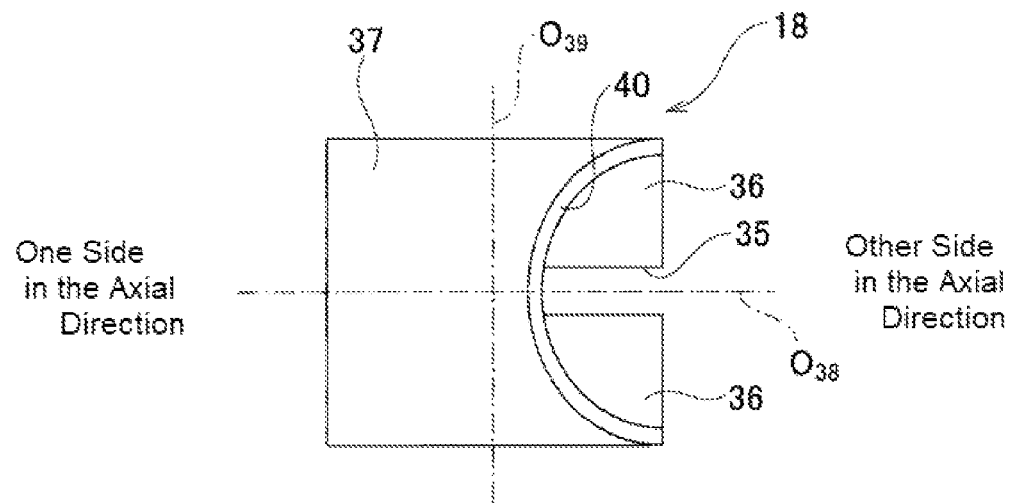
FIG. 8A is a plan view of the clamp of the torque transmission shaft according to the first example.
FIG. 8B is a side view of the clamp of the torque transmission shaft according to the first example.
Figure 8:
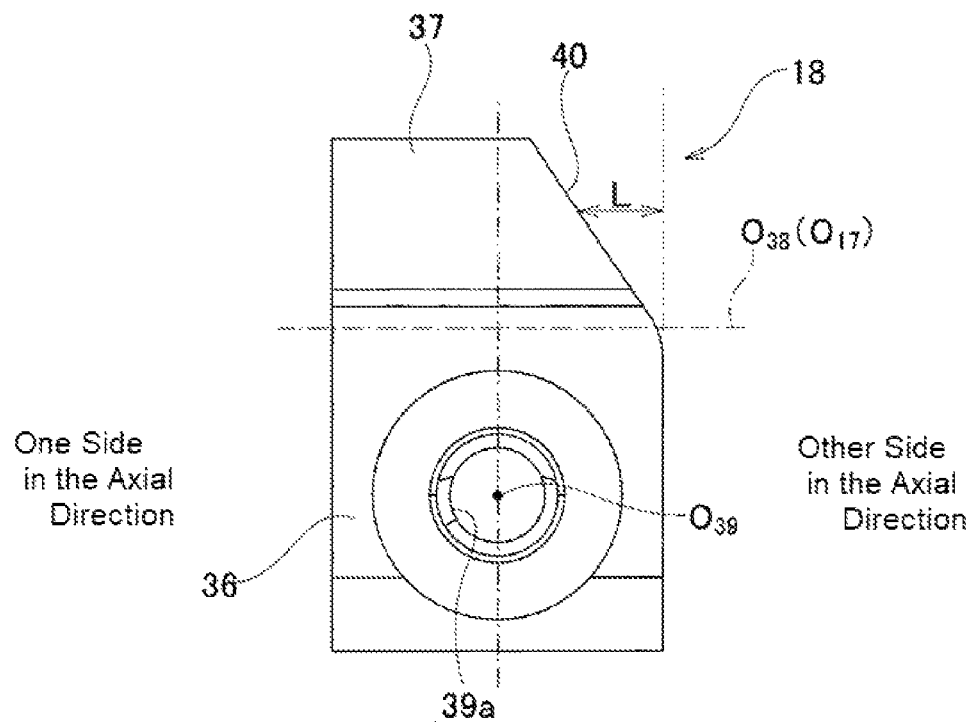

A first example of an embodiment of the present invention will be described with reference to FIGS. 1 to 10. A torque transmission shaft 16 of this example is incorporated in a steering apparatus and is used to connect between a steering shaft and an intermediate shaft, or between an intermediate shaft and a pinion shaft, which are rotating shafts that do not exist on the same straight line with each other, so that torque can be transmitted.

The torque transmission shaft 16 includes a shaft 17 having a hollow cylindrical shape and a clamp 18 having an incomplete cylindrical shape (substantially U-shaped), which are separately formed from each other. In the following description, the axial direction, unless specified otherwise, means the axial direction of the torque transmission shaft 16. Moreover, one side in the axial direction is the side opposite to the side on which the clamp 18 is arranged, and is the left side in FIGS. 1, 2, 3, 5, 6, 9, and 10. The other side in the axial direction is the side on which the clamp 18 is arranged, and is the right side in FIGS. 1, 2, 3, 5, 6, 9, and 10.

The shaft 17 is integrally formed as a whole by performing forging (cold forging or hot forging) and cutting or the like of a material such as machine structural steel pipe (STKM materials) or the like. The intermediate portion in the axial direction of the shaft 17 has a larger diameter compared with both side portions in the axial direction. The shaft 17 includes an insertion cylinder portion 19, an insertion side conical cylinder portion 20, a large diameter cylinder portion 21, a fitting side conical cylinder portion 22, and a fitting cylinder portion 23 in this order from the one side in the axial direction.

Figure 10:
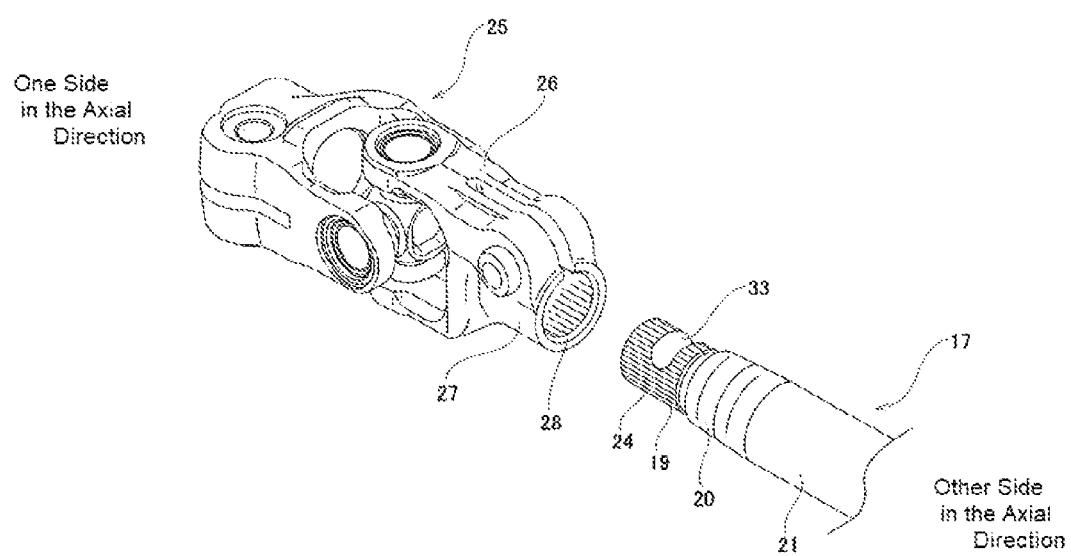
FIG. 10 is an exploded perspective view of the torque transmission shaft according to the first example and a yoke that is connected to the torque transmission shaft.

The insertion cylinder portion 19 has a cylindrical shape and is arranged at one end portion in the axial direction of the shaft 17. The insertion cylinder portion 19 has a male serration 24 around the outer circumferential surface. The male serration 24 is formed by broaching, pressing, or the like. The tooth tip circle of the male serration 24 has a circular shape (perfect circle) except for a portion where an insertion side engaging concave groove 33, which will be described later, is formed. The tooth tip circle diameter of the male serration 24 is substantially the same as the outer-diameter dimension of the fitting cylinder portion 23, and is smaller than the outer-diameter dimension of the large diameter cylinder portion 21. The inner circumferential surface of the insertion cylinder portion 19 is a cylindrical surface having an inner-diameter dimension that does not change in the axial direction. The edge of the other end in the axial direction of the insertion cylinder portion 19 is connected to the edge of the one end in the axial direction of the insertion side conical cylinder portion 20. As illustrated in FIG. 10, the insertion cylinder portion 19 is inserted into a base portion 27 of the yoke 26 of the universal joint 25, and the male serration 24 is able to engage with a female serration 28 formed on the inner circumferential surface of the base portion 27 of the yoke 26 with a serration engagement such that relative rotation is not possible.

The insertion side conical cylinder portion 20 has a substantially conical cylinder shape, and the outer-diameter dimension and the inner-diameter dimension gradually increase toward the other side in the axial direction. The edge of the other end in the axial direction of the insertion side conical cylinder portion 20 is connected to the edge of the one end in the axial direction of the large diameter cylinder portion 21.

The large diameter cylinder portion 21 has a cylindrical shape, and the edge on the other end in the axial direction of the large diameter cylinder portion 21 is connected to the edge of the one end in the axial direction of the fitting side conical cylinder portion 22. The inner circumferential surface and the outer circumferential surface of the large diameter cylinder portion 21 are each formed of a cylindrical surface having a diameter dimension that does not change in the axial direction. The outer-diameter dimension and inner-diameter dimension of the large diameter cylinder portion 21 are larger than the outer-diameter dimension and inner-diameter dimension of both the insertion cylinder portion 19 and the fitting cylinder portion 23. Moreover, the dimension in the axial direction of the large diameter cylinder portion 21 is larger than the dimension in the axial direction of both the insertion cylinder portion 19 and the fitting cylinder portion 23.

The fitting side conical cylinder portion 22 has a conical cylinder shape, and the outer-diameter dimension and the inner-diameter dimension are continuously reduced toward the other side in the axial direction. The edge of the other end in the axial direction of the fitting side conical cylinder portion 22 is connected to the edge of the one end in the axial direction of the fitting cylinder portion 23.

Figure 9:
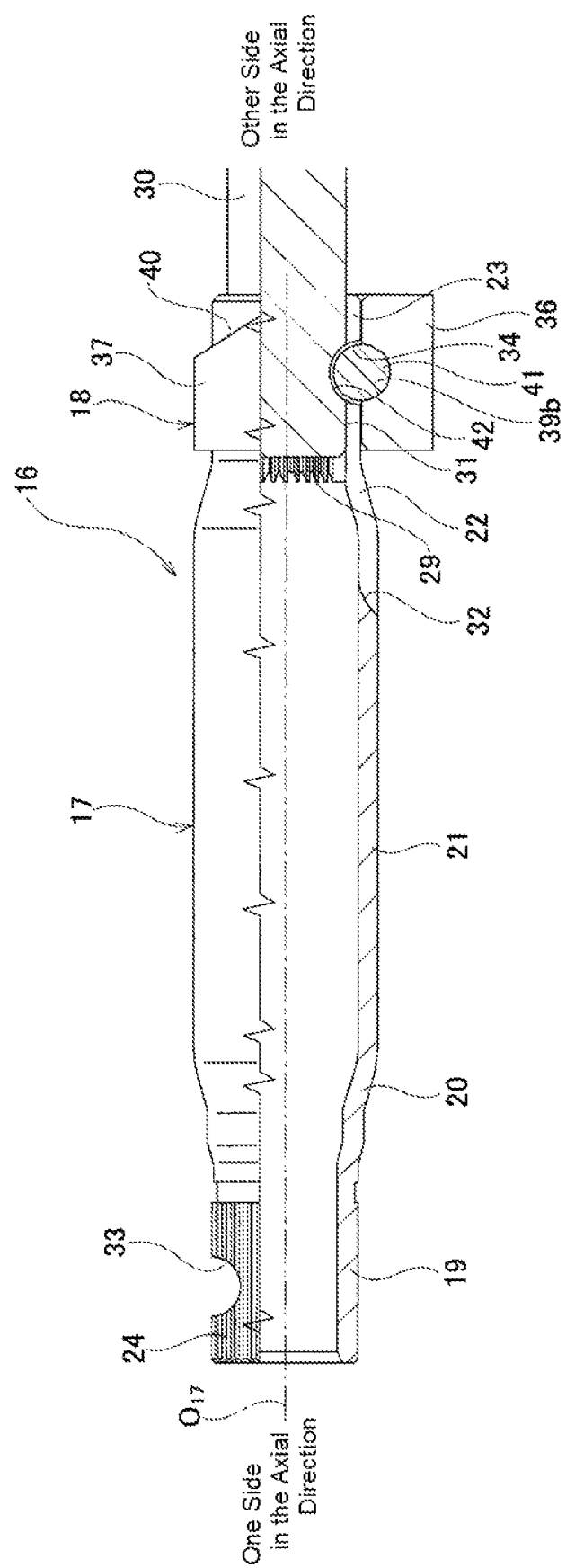
FIG. 9 is a cross-sectional view of a connecting portion between the torque transmission shaft according to the first example and a shaft that is connected to the torque transmission shaft.

The fitting cylinder portion 23 has a cylindrical shape, is arranged at the other end portion in the axial direction of the shaft 17, and has a female serration 29 around the inner circumferential surface. The female serration 29 is formed by broaching, pressing, or the like. The outer circumferential surface of the fitting cylinder portion 23 has a cylindrical surface shape of which the outer diameter dimension does not change in the axial direction, and the contour shape of the fitting cylinder portion 23 is a circular shape (perfect circle) except for a portion where a fitting side engaging concave groove 34, which will be described later, is formed. The dimension in the axial direction of the fitting cylinder portion 23 is slightly larger than the dimension in the axial direction of the clamp 18. As illustrated in FIG. 9, the end portion of a shaft 30 such as the steering shaft, the pinion shaft or the like is inserted inside the fitting cylinder portion 23, and the male serration 31 formed on the outer circumferential surface of the shaft 30 is able to engage with the female serration 29 with a serration engagement such that relative rotation is not possible.

The shaft 17 includes a slit 32 that extends in the axial direction in a range extending from the large diameter cylinder portion 21 to the fitting cylinder portion 23, which is located from the intermediate portion in the axial direction to the other end portion in the axial direction. The slit 32 communicates with the inner circumferential surface and the outer circumferential surface of the shaft 17, and is formed at one location in the circumferential direction of the shaft 17. The slit 32 has a closed end on the one side in the axial direction, and the closed end, which is one end portion in the axial direction of the slit 32, is located at the other end portion in the axial direction of the large diameter cylinder portion 21 existing on the one side in the axial direction from the fitting cylinder portion 23. Therefore, the closed end, which is the one end portion in the axial direction of the slit 32, exists on the one side in the axial direction from the fitting side conical cylinder portion 22 that is adjacent to the one side in the axial direction of the fitting cylinder portion 23. The slit 32 has an opening end on the other side in the axial direction, and is open on the edge of the other end in the axial direction of the fitting cylinder portion 23 (shaft 17). In this example, the width dimension of the slit 32 is constant over the entire length. The slit 32 is formed, for example, by cutting using a rotary cutting tool such as a cutter or the like. Therefore, the cross-sectional shape of the one end portion (back-end portion) in the axial direction, which is the closed end of the slit 32, has a partial arc shape. Moreover, in the slit 32, the one end portion in the axial direction is a closed end and the other end portion in the axial direction is an open end, and thus the rigidity of the fitting cylinder portion 23 to which the clamp 18 is fitted is such that the rigidity of the one side portion in the axial direction near the closed end of the slit 32 is higher than the rigidity of the other side portion in the axial direction near the open end of the slit 32. It should be noted that although not illustrated, a stress relaxation portion having a width dimension larger than that of a portion adjacent to the other side in the axial direction and having a substantially circular opening shape as seen in a plan view is provided at the back-end portion of the slit 32 can also be provided. In a case where such a stress relaxation portion is provided, it is possible to effectively prevent damage such as cracking or the like from occurring at the back-end portion of the slit 32 where stress tends to concentrate when the diameter of the shaft 17 is reduced.

The shaft 17 has an insertion side engaging concave groove 33 on the outer circumferential surface of the intermediate portion in the axial direction of the insertion cylinder portion 19, and the fitting side engaging concave groove 34 on the outer circumferential surface of the intermediate portion in the axial direction of the fitting cylinder portion 23. The insertion side engaging concave groove 33 and the fitting side engaging concave groove 34 are arranged in parallel with each other and extend in a direction orthogonal to the center axis $O_{17}$ of the shaft 17. The insertion side engaging concave groove 33 and the fitting side engaging concave groove 34 are arranged at positions that are 180 degrees out of phase in the circumferential direction. More specifically, the insertion side engaging concave groove 33 is arranged at a position 180 degrees out of phase in the circumferential direction with respect to the slit 32, whereas the fitting side engaging concave groove 34 is arranged at a position in phase in the circumferential direction with respect to the slit 32. Therefore, the fitting side engaging concave groove 34 is formed so as to intersect the slit 32. The intersection between the fitting side engaging concave groove 34 and the slit 32 is a wide portion 43 having a larger width dimension than the portion of the slit 32 adjacent to both sides in the axial direction of the intersection. Moreover, the insertion side engaging concave groove 33 and the fitting side engaging concave groove 34 are configured in a partial cylindrical surface shape. The radius of curvature of the insertion side engaging concave groove 33 is substantially the same as the radius of curvature of the mounting hole provided in the base portion 27 of the yoke 26, and the radius of curvature of the fitting side engaging concave groove 34 is substantially the same as the radius of curvature of the mounting holes 39a, 39b provided in the clamp 18. In this example, the insertion side engaging concave groove 33 is provided at one location in the circumferential direction on the outer circumferential surface of the insertion cylinder portion 19, but the insertion side engaging concave groove may also be configured by an annular concave groove that is continuous in the circumferential direction.

The clamp 18 is externally fitted on the other end portion in the axial direction of the shaft 17, and has a function of reducing the diameter of the other end portion in the axial direction of the shaft 17. More specifically, the clamp 18 is externally fitted on the fitting cylinder portion 23 of the shaft 17, and has a function of reducing the diameter of the range from the other end portion in the axial direction of the large diameter cylinder portion 21 to the fitting cylinder portion 23 in which the slit 32 is formed. The clamp 18 is made by performing hot forging, cutting or the like on a material such as S35C, which is a carbon steel for machine structures and which has a hardness higher than that of the material constituting the shaft 17, or is made by performing cold forging that causes work hardening on a material such as S10C, S15C, or the like which is carbon steel for machine structures.

The clamp 18 has an incomplete cylindrical shape (substantially U-shaped) as a whole, and includes a discontinuous portion 35, a pair of flange portions 36 each having a substantially rectangular plate shape, a semi-cylindrical connecting portion 37, and an insertion hole 38.

The discontinuous portion 35 is provided at one location in the circumferential direction of the clamp 18, which is located between the pair of flange portions 36. The pair of flange portions 36 are arranged on both sides of the discontinuous portion 35. The connecting portion 37 is located on the opposite side from the discontinuous portion 35 in the radial direction of the clamp 18, and connects the pair of flange portions 36 in the circumferential direction. The insertion hole 38 is capable of the fitting cylinder portion 23 of the shaft 17 being inserted therein, and includes an inner circumferential surface of the connecting portion 37 and inner side surfaces in the radial direction of the pair of flange portions 36. The insertion hole 38 has a partial cylindrical surface shape, and the inner-diameter dimension of the insertion hole 38 is the same as or slightly larger than the outer-diameter dimension of the fitting cylinder portion 23 in the free state of the clamp 18.

In a state in which the clamp 18 is fixed to the fitting cylinder portion 23 of the shaft 17, the positions in the circumferential direction of the discontinuous portion 35 and the slit 32 coincide with each other. In this example, the width dimension of the discontinuous portion 35 in the free state of the clamp 18 and the width dimension of the slit 32 in the free state of the shaft 17 (fitting cylinder portion 23) are substantially the same as each other.

The pair of flange portions 36 includes coaxially arranged mounting holes 39a, 39b that penetrate in the plate thickness direction through portions that are aligned with each other. The mounting holes 39a, 39b are formed at positions that are skewed with respect to the center axis $O_{38}$ of the insertion hole 38, and that are open to the insertion hole 38. Moreover, of the mounting holes 39a, 39b, one mounting hole 39a is a through hole and the other mounting hole 39b is a screw hole. In a state in which the clamp 18 is fixed to the fitting cylinder portion 23 of the shaft 17, the fitting side engaging concave groove 34 is located at a position facing each of the openings of the mounting holes 39a, 39b. In other words, the positions in the axial direction of the mounting holes 39a, 39b and the fitting side engaging concave groove 34 coincide. Furthermore, the plate thickness (thickness dimension) of each of the pair of flange portions 36 is substantially the same as each other.

The connecting portion 37 includes a notch 40 on the other side portion in the axial direction and that is recessed from the other end surface in the axial direction toward the one side in the axial direction of the pair of flange portions 36. The notch 40 extends in the circumferential direction of the connecting portion 37, and has a symmetrical shape with respect to a virtual plane that includes the center axis $O_{17}$ of the shaft 17 (=the center axis $O_{38}$ of the insertion hole 38) and is orthogonal to the center axis $O_{39}$ of the mounting holes 39a, 39b. As illustrated in FIG. 8B, the notch 40 has a substantially triangular shape when viewed from the axial direction of the mounting holes 39a, 39b. Therefore, the width L in the axial direction corresponding to the notch depth of the notch 40 increases as going away from the pair of flange portions 36 in the circumferential direction of the connecting portion 37 (FIG. 8B), and becomes the largest at the portion located on the opposite side from the discontinuous portion 35 in the radial direction (the upper end portion of FIG. 8B). In other words, the width L in the axial direction of the notch 40 is the smallest at both ends in the circumferential direction of the connecting portion 37, and is the largest at the central portion in the circumferential direction of the connecting portion 37.

The notch 40 is located on the other side in the axial direction from the center axis $O_{39}$ of the mounting holes 39a, 39b. More specifically, the edge on the one end in the axial direction of the notch 40 is located on the other side in the axial direction from the center axis $O_{39}$ of the mounting holes 39a, 39b, and is located on the one side in the axial direction from the edge on the other end in the axial direction of the mounting holes 39a, 39b. Moreover, the end portions of the notch 40 in the circumferential direction of the connecting portion 37 (the boundary position in the circumferential direction between the connecting portion 37 and the notch 40) is positioned on the side near the mounting holes 39a, 39b (FIG. 4, FIG. 8B) from the center axis $O_{17}$ of the shaft 17 in the direction orthogonal to both the center axis $O_{39}$ of the mounting holes 39a, 39b and the center axis $O_{17}$ of the shaft 17 (FIG. 4, FIG. 8B) on the edge of the other end in the axial direction of the connecting portion 37.

On the other hand, in a state before forming the notch 40, the connecting portion 37 had the same width in the axial direction as the pair of flange portions 36 over the entire circumference; however, due to the presence of the notch 40, the connecting portion 37 has the same width in the axial direction as the pair of flange portions 36 on both end portions in the circumferential direction connected to the pair of flange portions 36, the width in the axial direction of the connecting portion 37 becomes smaller as going away from the pair of flange portions 36 in the circumferential direction, and at the central portion in the circumferential direction located on the opposite side from the discontinuous portion 35 in the radial direction, the width in the axial direction of the connecting portion 37 is about ⅗ of the width in the axial direction of the pair of flange portions 36. Therefore, the connecting portion 37 has a trapezoidal shape such that the shoulder portion (corner portion) on the other side in the axial direction is cut off diagonally when viewed from the axial direction of the mounting holes 39a, 39b. As a result, the other end surface in the axial direction of the connecting portion 37 (the boundary position in the axial direction between the connecting portion 37 and the notch 40) is linearly inclined in the direction toward the one side in the axial direction as going away from the pair of flange portions 36 in the circumferential direction of the connecting portion 37. In other words, the other end surface in the axial direction of the connecting portion 37 does not exist on a virtual plane orthogonal to the center axis $O_{38}$ of the insertion hole 38 like the one end surface in the axial direction of the connecting portion 37, and is inclined with respect to the center axis $O_{38}$ of the insertion hole 38. In this example, the inclination angle of the other end surface in the axial direction of the connecting portion 37 with respect to the center axis $O_{38}$ of the insertion hole 38 is about 50 degrees to 60 degrees (about 55 degrees in the illustrated example). In this example, of the other side portion in the axial direction of the fitting cylinder portion 23, the portion located on the opposite side from the slit 32 in the radial direction is not covered by the connecting portion 37 of the clamp 18, but is exposed to the outside from the notch 40.

In this example, the shaft 17 and the clamp 18 are connected and fixed together. The structure for connecting and fixing the shaft 17 and the clamp 18 is not particularly limited; however, for example, a structure in which the shaft 17 and the clamp 18 are welded and fixed together can be adopted. In this case, of the portion between the opening edge on the one side in the axial direction of the insertion hole 38 of the clamp 18 and the outer circumferential surface of the shaft 17, the shaft 17 and the clamp 18 can be welded and fixed together by forming a welded portion by spot welding at one location in the circumferential direction on the opposite side from the slit 32 in the radial direction of the shaft 17. Alternatively, a structure or the like in which a convex shaped (or concave shaped) shaft side engaging portion formed on the outer circumferential surface of the shaft 17 and a concave shaped (or convex shaped) clamp side engaging portion formed on the inner circumferential surface of the clamp 18 engage with a concave-convex engagement, and the shaft-side engaging portion or the clamp-side engaging portion is plastically deformed (crimped) may be adopted. In either case, in a state in which the shaft 17 and the clamp 18 are fixed, the relative rotation of the shaft 17 and the clamp 18 is prevented and the relative displacement in the axial direction is prevented.

In order to connect and fix the shaft 17 and the clamp 18, first, the other end portion in the axial direction of the shaft 17 is inserted inside the insertion hole 38 of the clamp 18 from the one side in the axial direction of the clamp 18. The positions in the circumferential direction of the discontinuous portion 35 of the clamp 18 and the slit 32 of the shaft 17 are then aligned with each other, and the positions in the axial direction of the mounting holes 39a, 39b and the fitting side engaging concave groove 34 are aligned.

Next, a tightening bolt 41 is arranged inside the mounting holes 39a, 39b and the fitting side engaging concave groove 34. More specifically, a portion of the tightening bolt 41 near the base end is inserted inside one of the mounting holes 39a, which is a through hole, and the intermediate portion of the tightening bolt 41 is arranged inside the fitting side engaging concave groove 34. In this state, the tip end portion of the tightening bolt 41 is slightly screwed into the other mounting hole 39b, which is a screw hole, or in other words, is screwed in to the extent that the diameter of the fitting cylinder portion 23 is not reduced. Then, the fitting side engaging concave groove 34 and the tightening bolt 41, both ends of which are supported with respect to the clamp 18, are made to engage with a key engagement. As a result, the clamp 18 is prevented from coming apart from the shaft 17 toward the other side in the axial direction, and the shaft 17 and the clamp 18 are prevented from rotating relative to each other. Finally, the shaft 17 and the clamp 18 are joined and connected and fixed by a fixing means such as welding or the like.

In a state of using the torque transmission shaft 16, the insertion cylinder portion 19 is inserted into the base portion 27 of the yoke 26 of the universal joint 25, and the male serration 24 of the insertion cylinder portion 19 is engaged with the female serration 28 of the base portion 27 of the yoke 26 with a serration engagement. As a result, the torque transmission shaft 16 is connected to the yoke 26 so as to be able to transmit torque, and is also connected to a shaft (not illustrated) that does not exist on the same axis as the torque transmission shaft 16 so as to be able to transmit torque via a universal joint 25. By causing an intermediate portion of a bolt (not illustrated) that is inserted through a mounting hole that is provided in the base portion 27 of the yoke 26 to enter inside the insertion side engaging concave groove 33, the yoke 26 and the torque transmission shaft 16 are prevented from relative movement in the axial direction.

The shaft 30 is inserted inside the fitting cylinder portion 23, and the male serration 31 of the shaft 30 is engaged with the female serration 29 of the fitting cylinder portion 23 with a serration engagement. As a result, the torque transmission shaft 16 and the shaft 30 are prevented from relative rotation. The intermediate portion of the tightening bolt 41 is passed through the wide portion 43, which is the intersection of the fitting side engaging concave groove 34 and the slit 32, and made to enter inside a circumferential concave groove 42 that is formed on the outer circumferential surface of the tip end portion of the shaft 30 so as to cross the male serration 31 in the circumferential direction, causing a key engagement between the circumferential concave groove 42 and the tightening bolt 41. This prevents the shaft 30 and the torque transmission shaft 16 from relative movement with each other in the axial direction. By increasing the screwing amount of the tightening bolt 41 with respect to the other mounting hole 39b, the width dimension of the discontinuous portion 35 is made smaller and the diameter of the fitting cylinder portion 23 is reduced. Then, the outer circumferential surface of the shaft 30 is strongly tightened by the inner circumferential surface of the fitting cylinder portion 23. As a result, the torque transmission shaft 16 and the shaft 30 are coupled so as to be able to transmit torque.

In the torque transmission shaft 16 of this example, it is possible to suppress whirling of the shaft connected to the torque transmission shaft 16. In other words, in the torque transmission shaft 16 of this example, the clamp 18 is fixed to the shaft 17 without being integrally provided with the shaft 17. Therefore, it is possible to secure a high degree of coaxiality between the male serration 24 and the female serration 29 arranged at both end portions in the axial direction of the shaft 17. Therefore, it is possible to suppress the whirling of the shaft connected to the male serration 24 and the shaft 30 connected to the female serration 29. As a result, it is possible to prevent the occurrence of abnormal noise (sliding noise in the rotation direction, stick-slip vibration noise, and the like) caused by the whirling of the shaft in a part of the steering apparatus. Moreover, the shaft 17 has a hollow cylindrical shape, and therefore the weight of the torque transmission shaft 16 as a whole can be reduced.

In the torque transmission shaft 16 of this example, it is possible to suppress precession of the shaft 30 connected to the other end portion in the axial direction of the shaft 17, and it is possible to suppress the occurrence of fretting wear at the serration engagement portion between the female serration 29 of the shaft 17 and the male serration 31 of the shaft 30. In other words, of the slit 32 formed in the shaft 17, the one end portion in the axial direction is a closed end and the other end portion in the axial direction is an open end, and thus, of the rigidity of the fitting cylinder portion 23 onto which the clamp 18 is fitted, the rigidity of the one side portion in the axial direction near the closed end of the slit 32 is higher than the rigidity of the other side portion in the axial direction near the open end of the slit 32. Therefore, unlike this example, when the diameter of the fitting cylinder portion 23 is reduced by using a clamp having no notch formed in the connecting portion, the fitting cylinder portion 23 tends to be deformed more significantly in the other side portion in the axial direction than in the one side portion in the axial direction. Accordingly, of the surface pressure between the inner circumferential surface of the fitting cylinder portion 23 and the outer circumferential surface of the shaft 30, the surface pressure of the one side portion in the axial direction (portion on the tip end side of the shaft 30) is higher than that of the other side portion in the axial direction (portion on the base end side of the shaft 30). In other words, the shaft 30 is strongly tightened by the other side portion in the axial direction of the fitting cylinder portion 23, and is in a relatively loosely tightened state by the one side portion in the axial direction of the fitting cylinder portion 23. Therefore, the shaft 30 tends to precess centered around the portion strongly tightened by the other side portion in the axial direction of the fitting cylinder portion 23. When this kind of precession occurs, fretting wear occurs in the serration engagement portion between the female serration 29 and the male serration 31, and the amount of wear tends to become excessive.

On the other hand, in this example, the notch 40 is provided in the other side portion in the axial direction of the connecting portion 37, and the other side portion in the axial direction of the fitting cylinder portion 23 having low rigidity is not covered by the connecting portion 37. Therefore, when the diameter of the fitting cylinder portion 23 is reduced by the clamp 18, of the fitting cylinder portions 23, it is possible to apply a larger tightening force to the one side portion in the axial direction having high rigidity than to the other side portion in the axial direction having low rigidity. Therefore, the amount of deformation generated in the one side portion in the axial direction and the other side portion in the axial direction of the fitting cylinder portion 23 can be brought close to each other. Accordingly, of the surface pressure between the inner circumferential surface of the fitting cylinder portion 23 and the outer circumferential surface of the shaft 30, the surface pressure of the one side portion in the axial direction and of the other side portion in the axial direction can be brought close to each other. As a result, it is possible to suppress the occurrence of precession in the shaft 30 connected to the other end portion in the axial direction of the shaft 17. Therefore, it is possible to suppress fretting wear from occurring in the serration engagement portion between the female serration 29 and the male serration 31. Furthermore, it is possible to prevent the looseness between the shaft 17 and the shaft 30, and it is also possible to prevent the generation of abnormal noise due to the looseness.

In this example, the notch 40 is located on the other side in the axial direction from the center axis of the mounting holes 39a, 39b, and thus when the diameter of the fitting cylinder portion 23 is reduced by the clamp 18, the connecting portion 37 can apply a large tightening force to the one side portion in the axial direction of the highly rigid fitting cylinder portion 23. Therefore, the surface pressure between the inner circumferential surface of the one side portion in the axial direction of the fitting cylinder portion 23 and the outer circumferential surface of the shaft 30 can be effectively increased. Moreover, the end portions of the notch 40 in the circumferential direction of the connecting portion 37 are located on the side near to the mounting holes 39a, 39b from the center axis $O_{17}$ of the shaft 17 in the direction orthogonal to both the center axis $O_{39}$ of the mounting holes 39a, 39b and the center axis $O_{17}$ of the shaft 17 on the edge of the other end in the axial direction of the connecting portion 37. Therefore, as illustrated in FIG. 4B, the edge on the other end in the axial direction of the shaft 17 has a semicircular arc-shaped portion located on the opposite side from the slit 32 in the radial direction that is exposed to the outside and is not covered by the connecting portion 37. Accordingly, when the diameter of the fitting cylinder portion 23 is reduced by the clamp 18, the tightening force applied to the edge on the other end in the axial direction of the shaft 17 can be sufficiently reduced. As a result, it is possible to more effectively prevent precession from occurring in the shaft 30 connected to the other end portion in the axial direction of the shaft 17. Moreover, the notch 40 is provided only in the connecting portion 37 and is not provided in the pair of flange portions 36, and thus it is possible to secure the fitting length in the axial direction of the clamp 18 with respect to the shaft 17. Therefore, the posture of the clamp 18 with respect to the shaft 17 can be stabilized.

Second Example

Figure 11:
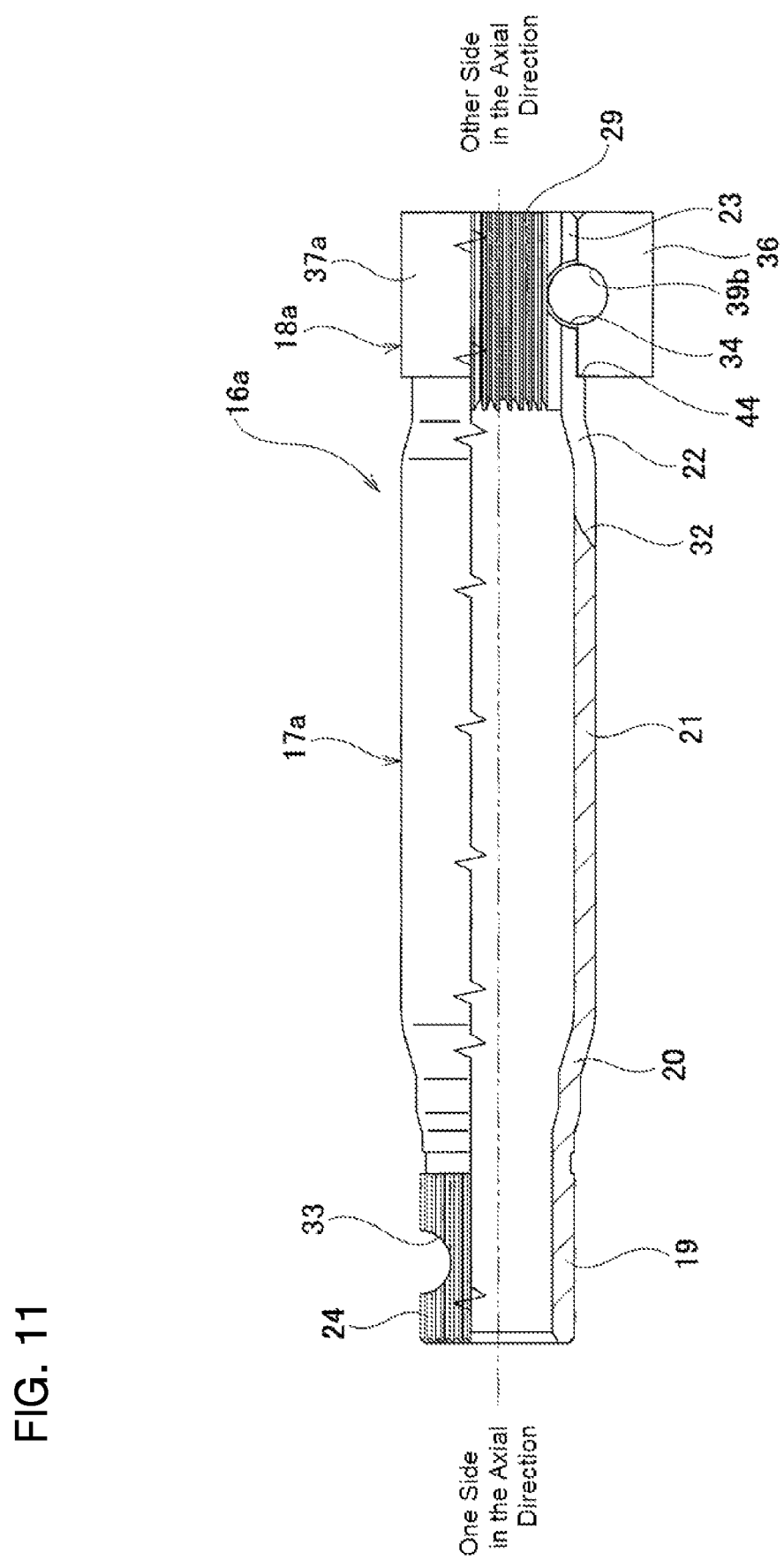
FIG. 11 is a diagram corresponding to FIG. 3 illustrating a torque transmission shaft according to a second example of an embodiment of the present invention.

A second example of an embodiment of the present invention will be described with reference to FIG. 11. In the torque transmission shaft 16a of this example, by performing cutting of the other end portion in the axial direction of the outer circumferential surface of the shaft 17a, a substantially circular ring-shaped (C-shaped) stepped surface 44 facing the other side in the axial direction is provided in a portion of the outer circumferential surface of the shaft 17a adjacent to the one side in the axial direction of the fitting cylinder portion 23. Moreover, a notch is not provided in the connecting portion 37a of the clamp 18a, and the width in the axial direction of the connecting portion 37a is constant over the circumferential direction.

In this example, when the clamp 18a is externally fitted onto the fitting cylinder portion 23, the end surface on the one side in the axial direction of the clamp 18a comes in contact with the stepped surface 44 to position the clamp 18a in the axial direction with respect to the shaft 17a. The other construction and effects are the same as in the first example.

Third Example

Figure 12:
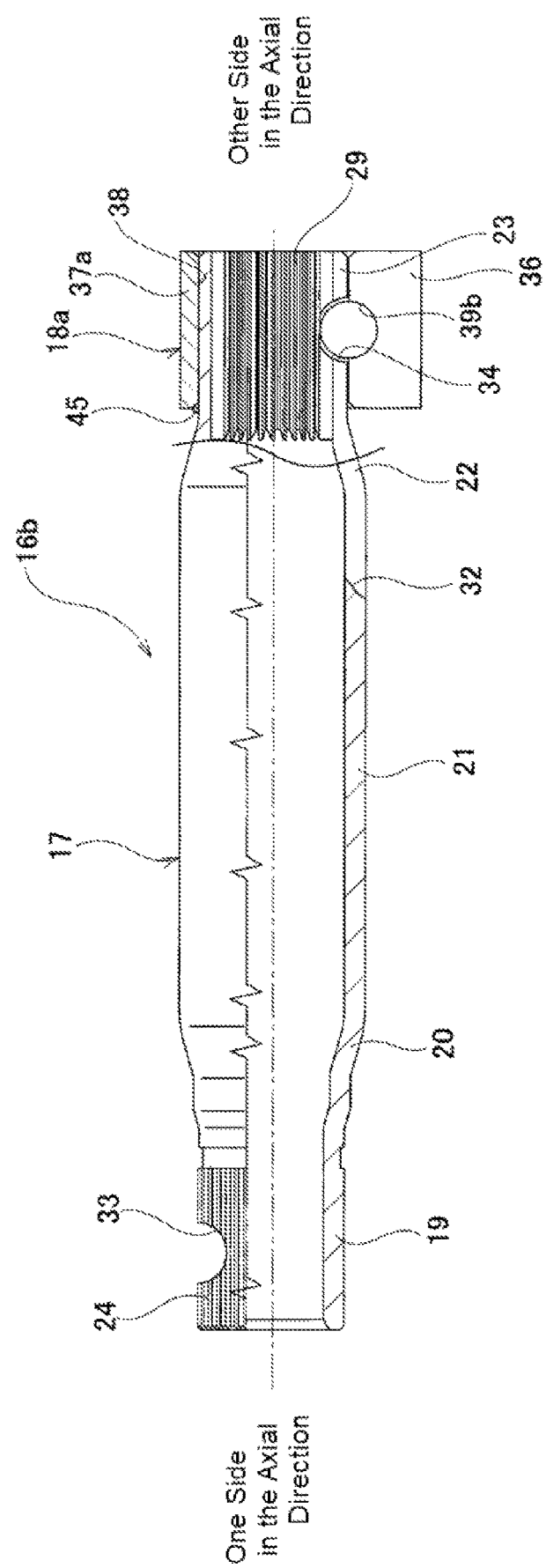
FIG. 12 is a diagram corresponding to FIG. 3 and illustrates a torque transmission shaft according to a third example of an embodiment of the present invention.

A third example of an embodiment of the present invention will be described with reference to FIG. 12. In the torque transmission shaft 16b of this example, the shaft 17 and the clamp 18a are welded and fixed together. More specifically, the shaft 17 and the clamp 18a are welded and fixed together by forming a welded portion 45 by spot welding at one location in the circumferential direction on the opposite side from the slit 32 in the radial direction of the shaft 17 in the portion between the edge of the opening on the one side in the axial direction of the insertion hole 38 of the clamp 18a and the outer circumferential surface of the shaft 17.

In this example, the welded portion 45 is arranged on the opposite side portion from the slit 32 in the radial direction of the shaft 17, and thus it is possible to prevent the amount of bending of the pair of flange portions 36 at the time of clamping from being affected (the balance of the amount of bending becoming poor) due to the arrangement of the welded portion 45. The other construction and effects are the same as in the first example.

Fourth Example

Figure 13:
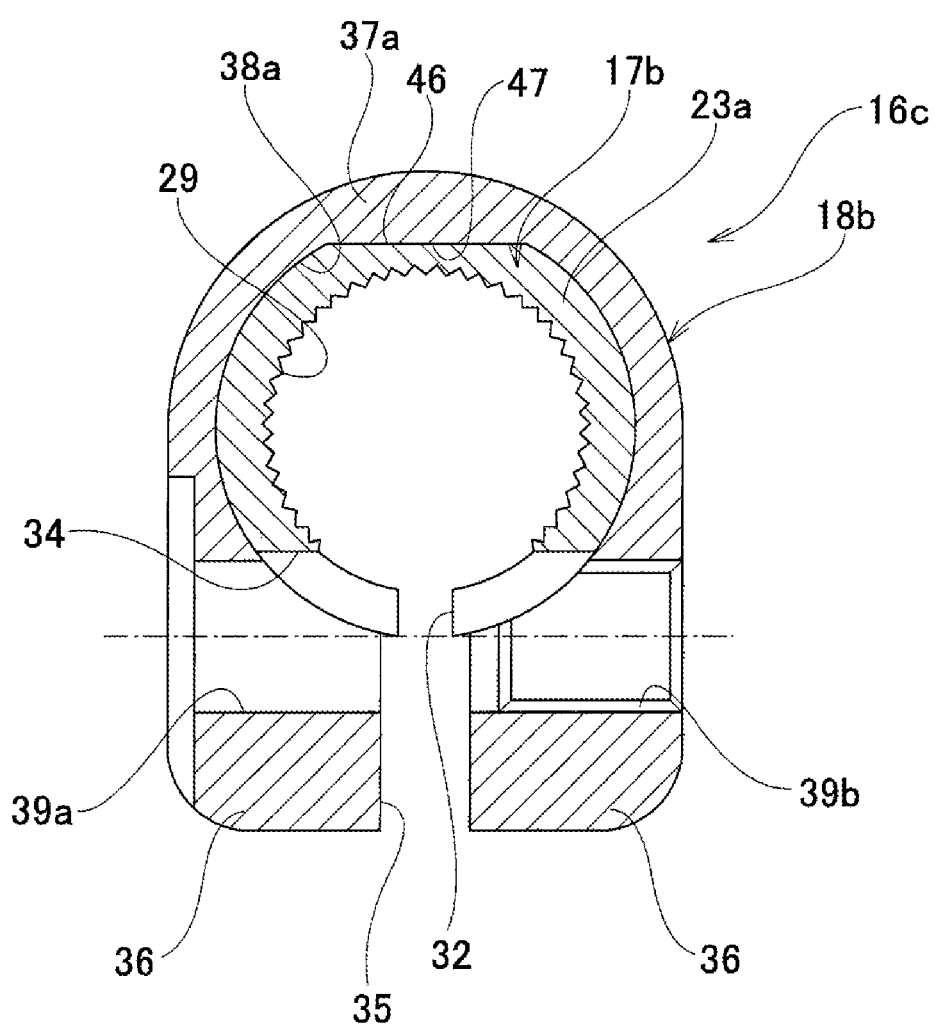
FIG. 13 is a diagram corresponding to FIG. 4A and illustrates a torque transmission shaft according to a fourth example of an embodiment of the present invention.
Figure 14:
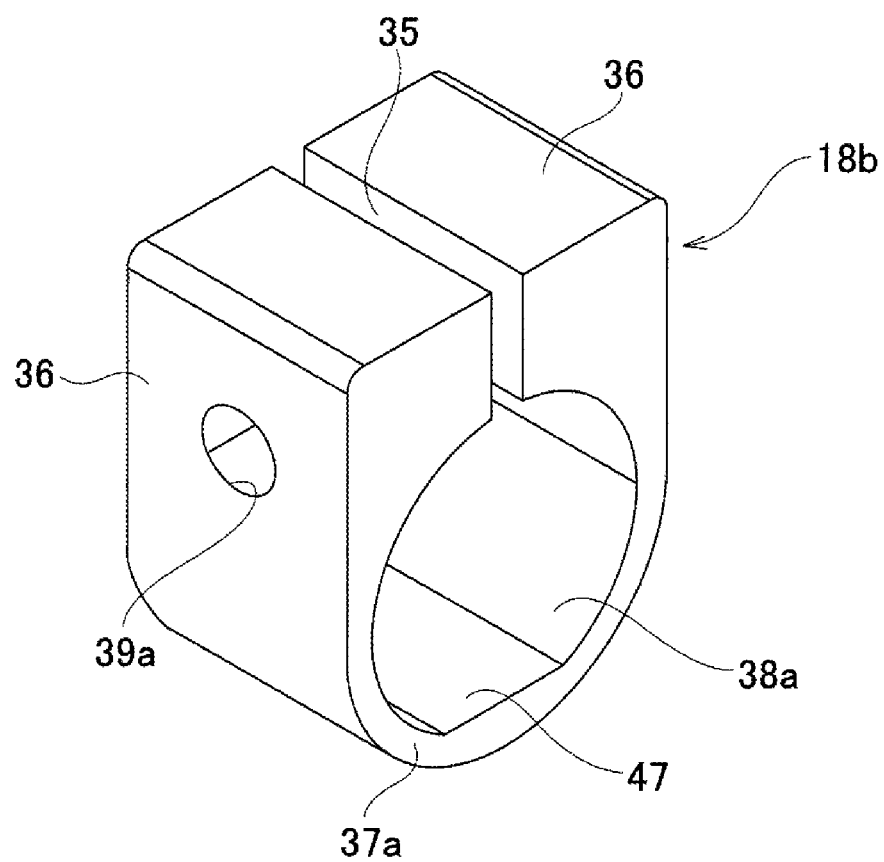
FIG. 14 is a diagram corresponding to FIG. 7 and illustrates a clamp of the torque transmission shaft according to the fourth example.

A fourth example of an embodiment of the present invention will be described with reference to FIGS. 13 and 14. In the torque transmission shaft 16c of this example, in order to prevent the clamp 18b from rotating relative to the shaft 17b before the clamp 18b is fixed to the other end portion in the axial direction of the shaft 17b, the outer circumferential surface of the shaft 17b and the inner circumferential surface of the insertion hole 38a of the clamp 18b are fitted with a non-circular fit.

The shaft 17b has a flat surface shaped shaft-side flat surface portion 46 on a portion of the outer circumferential surface of the other end portion in the axial direction that is opposite from the slit 32 in the radial direction of the shaft 17b. Accordingly, the contour shape of the outer circumferential surface of the fitting cylinder portion 23a has a substantially D shape that includes an arc portion and a straight portion. The clamp 18b has a flat surface shaped clamp-side flat portion 47 on a portion of the inner circumferential surface of the insertion hole 38a that is opposite from the discontinuous portion 35 in the radial direction of the insertion hole 38a. Therefore, the contour shape of the inner circumferential surface of the insertion hole 38a of the clamp 18b also has a substantially D-shape that includes an arc portion and a straight portion.

In this example, when the other end portion in the axial direction of the shaft 17b is inserted into the insertion hole 38a of the clamp 18b, there is surface contact between the flat surface shaped shaft-side flat surface portion 46 and the flat surface shaped clamp-side flat portion 47. As a result, the outer circumferential surface of the shaft 17b and the inner circumferential surface of the insertion hole 38a of the clamp 18b are fitted together with a non-circular fit, and the shaft 17b and the clamp 18b are prevented from rotating relative to each other. The other construction and effects are the same as in the first example.

Fifth Example

Figure 15:
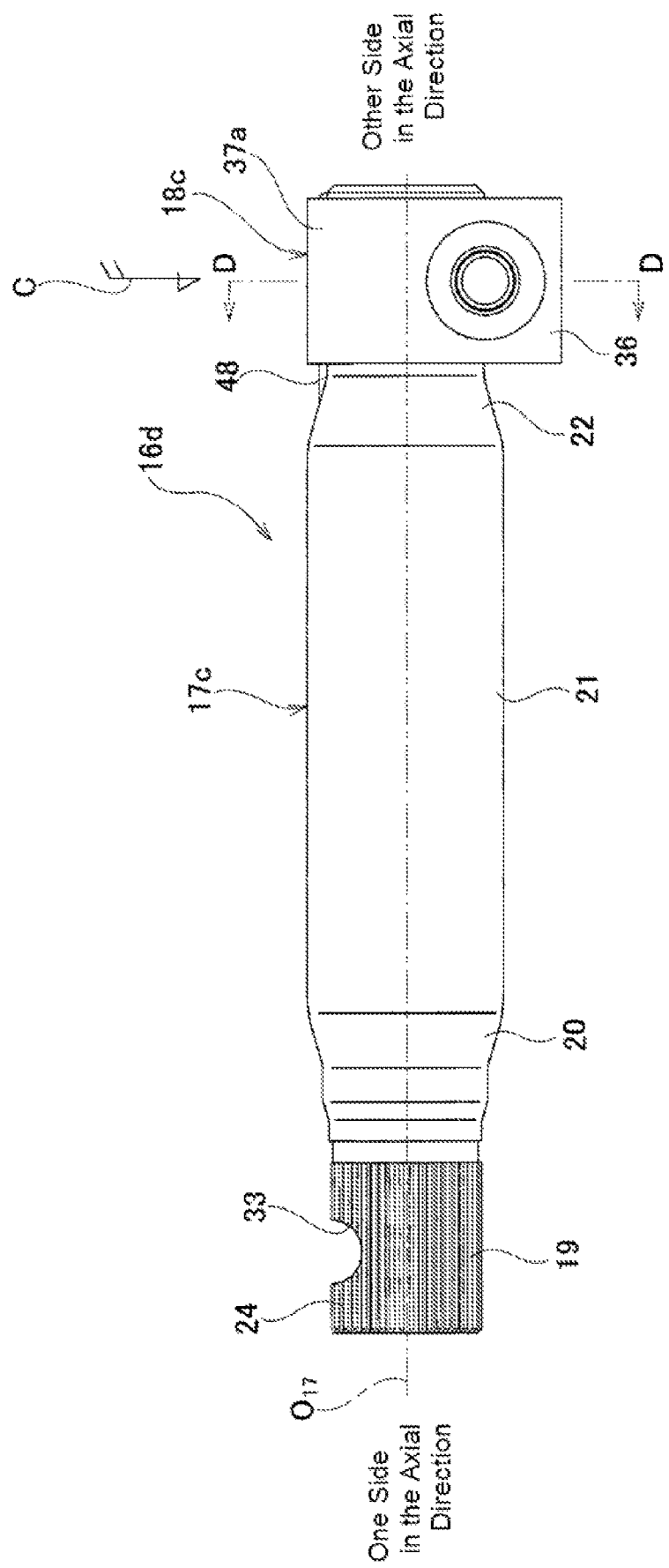
FIG. 15 is a diagram corresponding to FIG. 1 and illustrates a torque transmission shaft according to a fifth example of an embodiment of the present invention.
Figure 16:
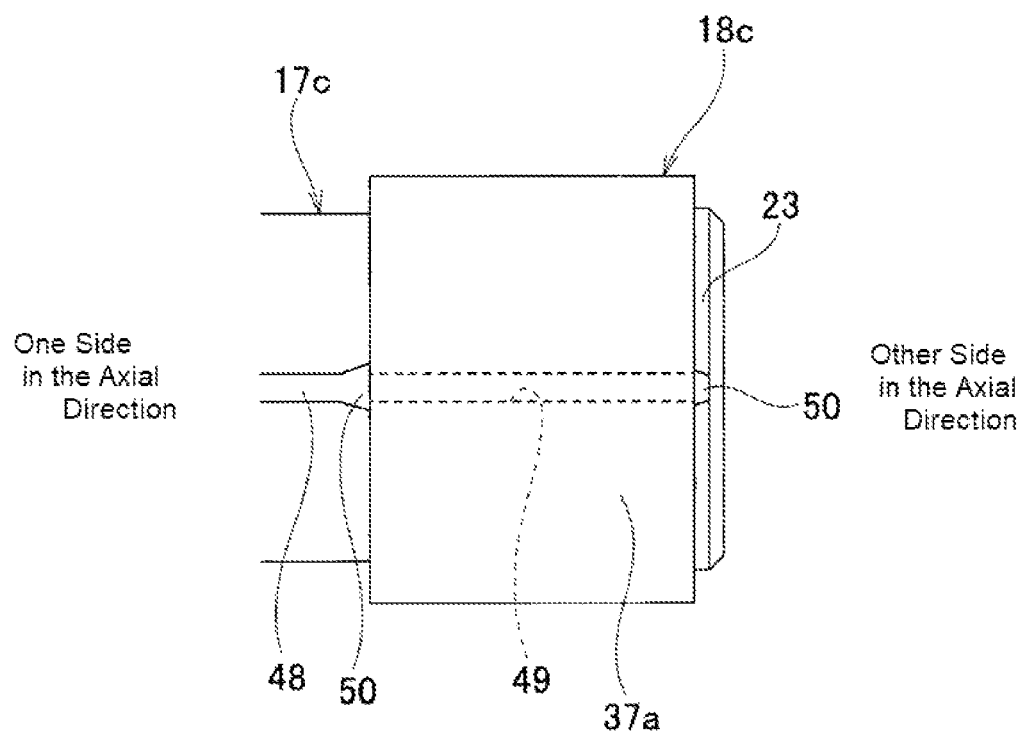
FIG. 16 is a view taken along the line C of FIG. 15.
Figure 17:
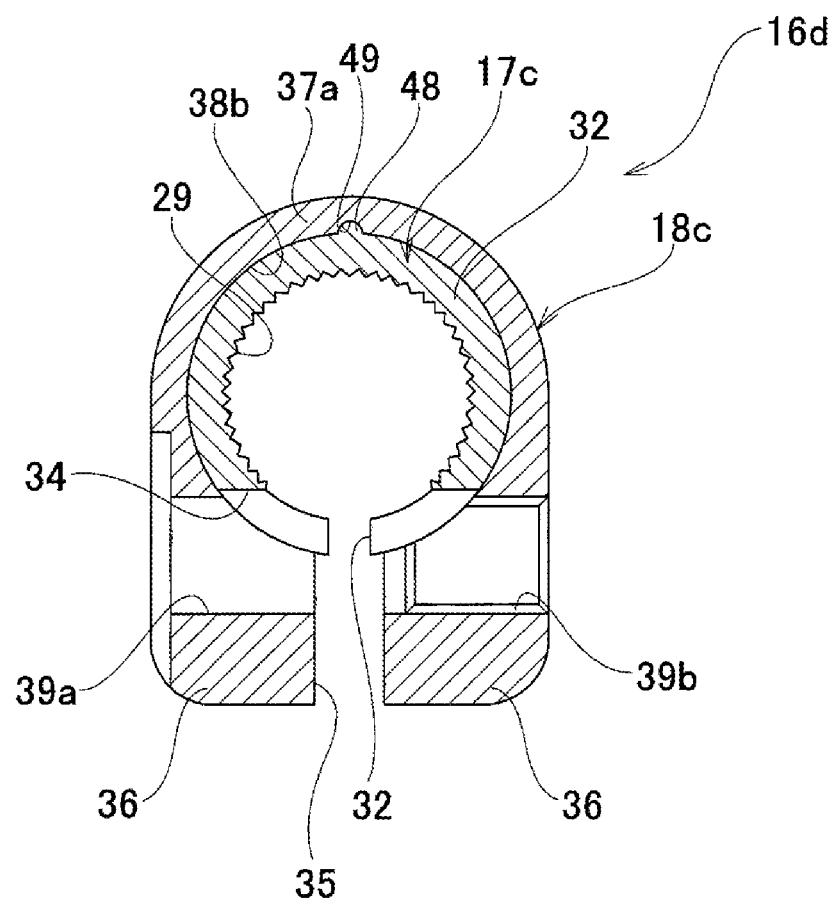
FIG. 17 is a cross-sectional view taken along the line D-D of FIG. 15.

A fifth example of an embodiment of the present invention will be described with reference to FIGS. 15 to 17. The torque transmission shaft 16d of this example includes a shaft-side engaging portion 48, which is a ridge extending in the axial direction in a range extending from the intermediate portion to the other end portion in the axial direction on the outer circumferential surface of the shaft 17c. The shaft-side engaging portion 48 is arranged on the outer circumferential surface of the shaft 17c on the side opposite from the slit 32 in the radial direction of the shaft 17c. Moreover, the shaft-side engaging portion 48 has a semicircular cross section, and the height dimension from the center axis $O_{17}$ of the shaft 17c to the top of the shaft-side engaging portion 48 and the width dimension of the shaft-side engaging portion 48 are constant over the entire length.

The inner circumferential surface of the insertion hole 38b of the clamp 18c is provided with a clamp-side engaging portion 49, which is a concave groove extending in the axial direction and capable of engaging with the shaft-side engaging portion 48 with a concave-convex engagement. The clamp-side engaging portion 49 is arranged on the inner circumferential surface of the insertion hole 38b on the opposite side from the discontinuous portion 35 in the radial direction of the insertion hole 38b. Moreover, the clamp-side engaging portion 49 extends over the entire width in the axial direction of the insertion hole 38b and opens on both end surfaces in the axial direction of the clamp 18c. The clamp-side engaging portion 49 has a semicircular cross section, and the depth dimension and the width dimension are constant over the entire length.

In this example, by inserting the shaft 17c into the insertion hole 38b of the clamp 18c from the other side in the axial direction, the shaft-side engaging portion 48 enters inside the clamp-side engaging portion 49. The shaft-side engaging portion 48 and the clamp-side engaging portion 49 are engaged with each other in a concave-convex engagement, which prevents the shaft 17c and the clamp 18c from rotating relative to each other. Furthermore, of the shaft-side engaging portion 48, by crimping and deforming portions adjacent to both sides in the axial direction of the clamp 18c, for example, by plastically deforming the portions so as to rise toward the end surfaces in the axial direction of the clamp 18c, crimped deformed portions 50 are formed in the portions. The crimped deformed portions 50 prevent the shaft 17c and the clamp 18c from being displaced relative to each other in the axial direction. The torque transmission shaft 16d of this example uses the shaft-side engaging portion 48 and the clamp-side engaging portion 49 to fix the clamp 18c to the fitting cylinder portion 23 of the shaft 17c. Therefore, in this example, it is possible to omit the work of welding and fixing the shaft 17c and the clamp 18c together. Although not illustrated, alternatively, the shaft-side engaging portion may be a concave groove extending in the axial direction, and the clamp-side engaging portion may be a ridge extending in the axial direction. The other construction and effects are the same as in the first example.

Sixth Example

Figure 18:
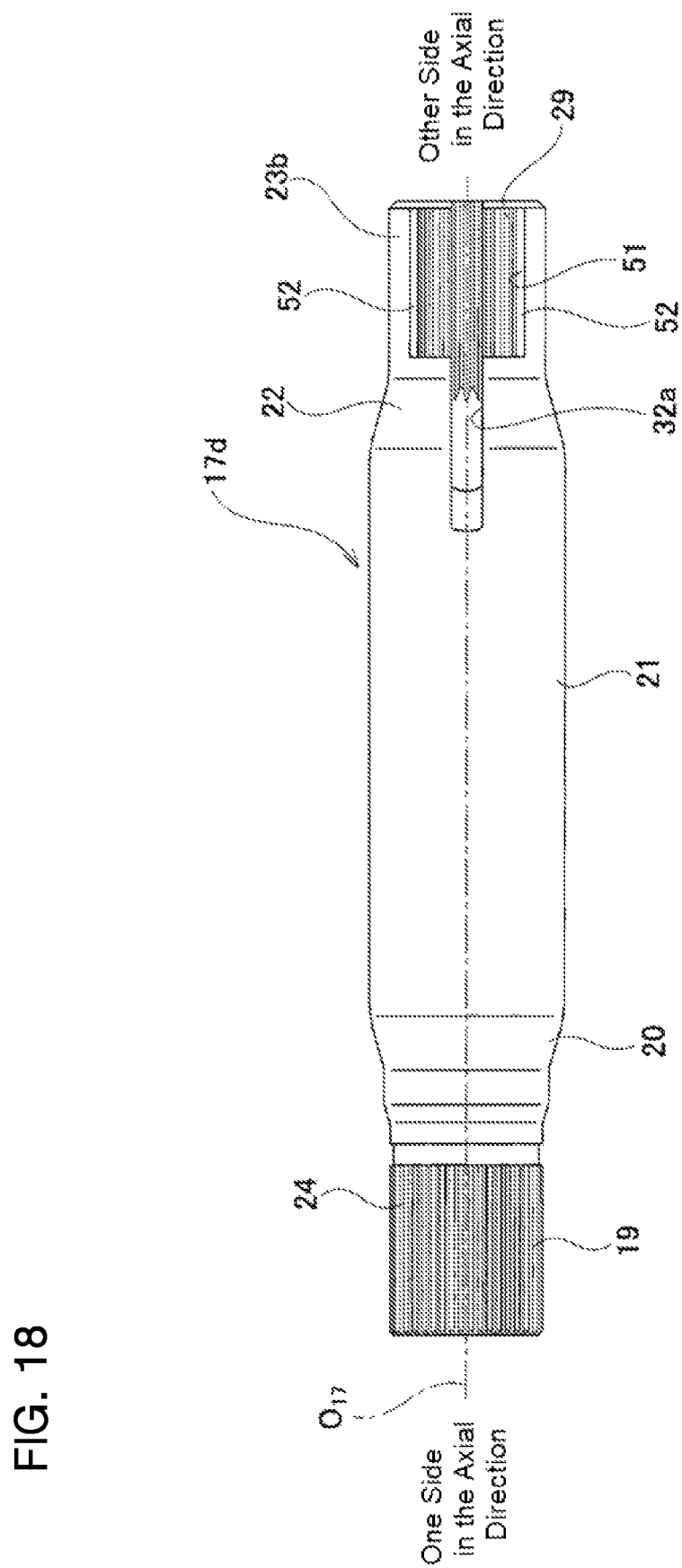
FIG. 18 is a diagram corresponding to FIG. 6 and illustrates a shaft of a torque transmission shaft according to a sixth example of an embodiment of the present invention.
Figure 19:
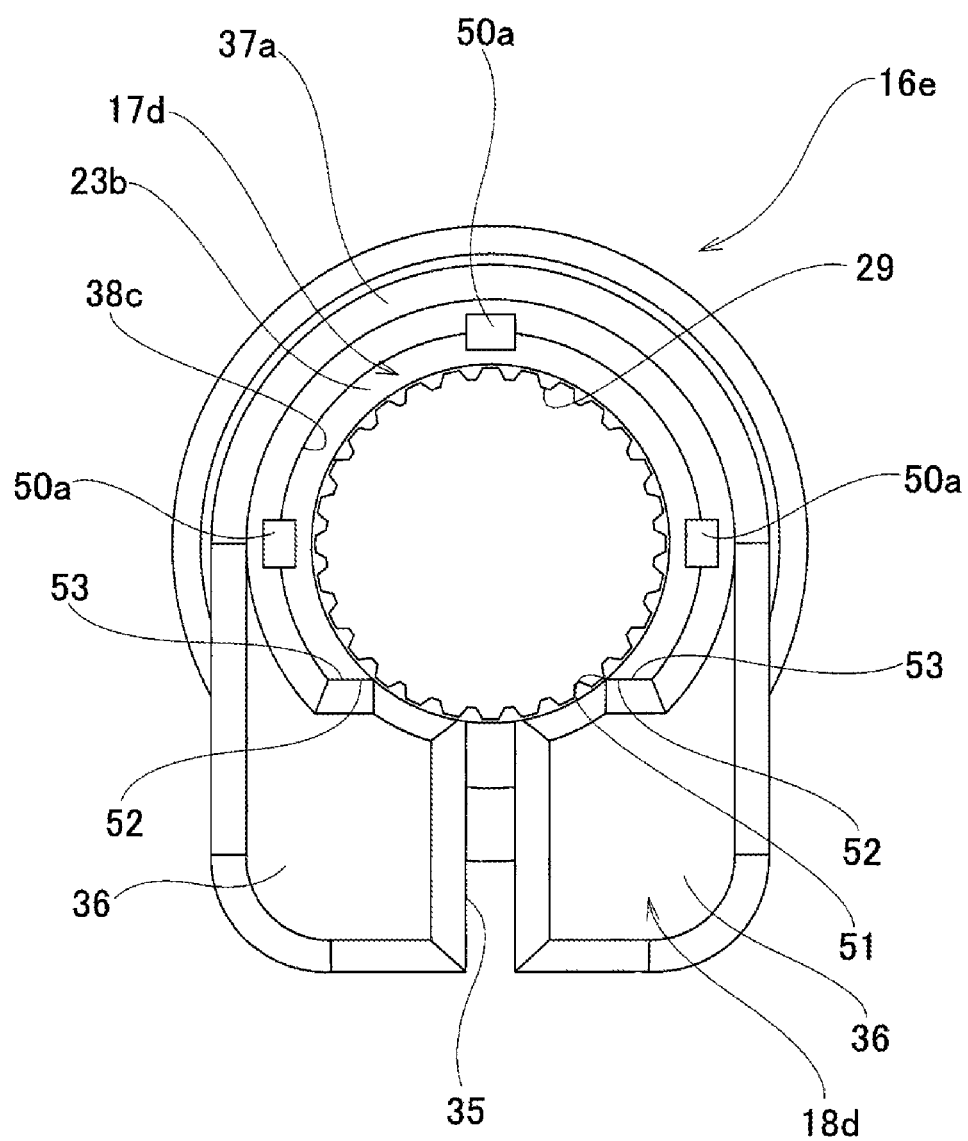
FIG. 19 is an end view of the torque transmission shaft according to the sixth example.

A sixth example of an embodiment of the present invention will be described with reference to FIGS. 18 and 19. In the torque transmission shaft 16e of this example, a wide portion 51 having a width dimension that is larger (for example, 3 times to 6 times larger) than the portion adjacent to the one side in the axial direction is provided in a portion on the other side half portion in the axial direction of the slit 32a that is aligned with the fitting cylinder portion 23b in the axial direction. In order for this, the fitting cylinder portion 23b has a C-shape when viewed from the axial direction and is provided with flat surface shaped shaft-side engaging surface portion 52 on both end surfaces in the circumferential direction existing on both sides of the wide portions 51. In this example, the shaft-side engaging surface portions 52 are located on the same virtual plane parallel to the center axis $O_{17}$ of the shaft 17d. The shaft-side engaging surface portions 52 are formed by cutting.

The contour shape of the inner circumferential surface of the insertion hole 38c of the clamp 18d is a substantially D-shape that includes an arc portion and a pair of straight portions. Of the inner circumferential surface of the insertion hole 38c, the portions (straight line portions) formed by the inner side surfaces in the radial direction of the pair of flange portions 36 are each composed of a flat surface-shaped clamp-side engaging surface portion 53.

In this example, in a state in which the other end portion in the axial direction of the shaft 17d is inserted into the insertion hole 38c of the clamp 18d and the clamp 18d is externally fitted onto the fitting cylinder portion 23b, the shaft-side engaging surface portions 52 and the clamp-side engaging surface portions 53 are engaged (in contact) with each other in the circumferential direction to prevent the shaft 17d and the clamp 18d from rotating relative to each other. Moreover, a plurality of locations (three locations in the illustrated example) in the circumferential direction of the other end surface in the axial direction of the shaft 17d are crimped and deformed to form crimped deformed portions 50a, which are plastically deformed portions, in those portions, and the crimped deformed portions 50a are pressed against the end surface on the other side in the axial direction of the clamp 18d. This prevents the shaft 17d and the clamp 18d from being displaced relative to each other in the axial direction. Therefore, also in the torque transmission shaft 16e of this example, it is possible to omit the work of welding and fixing the shaft 17d and the clamp 18d together. The other construction and effects are the same as in the first example.

Seventh Example

Figure 20:
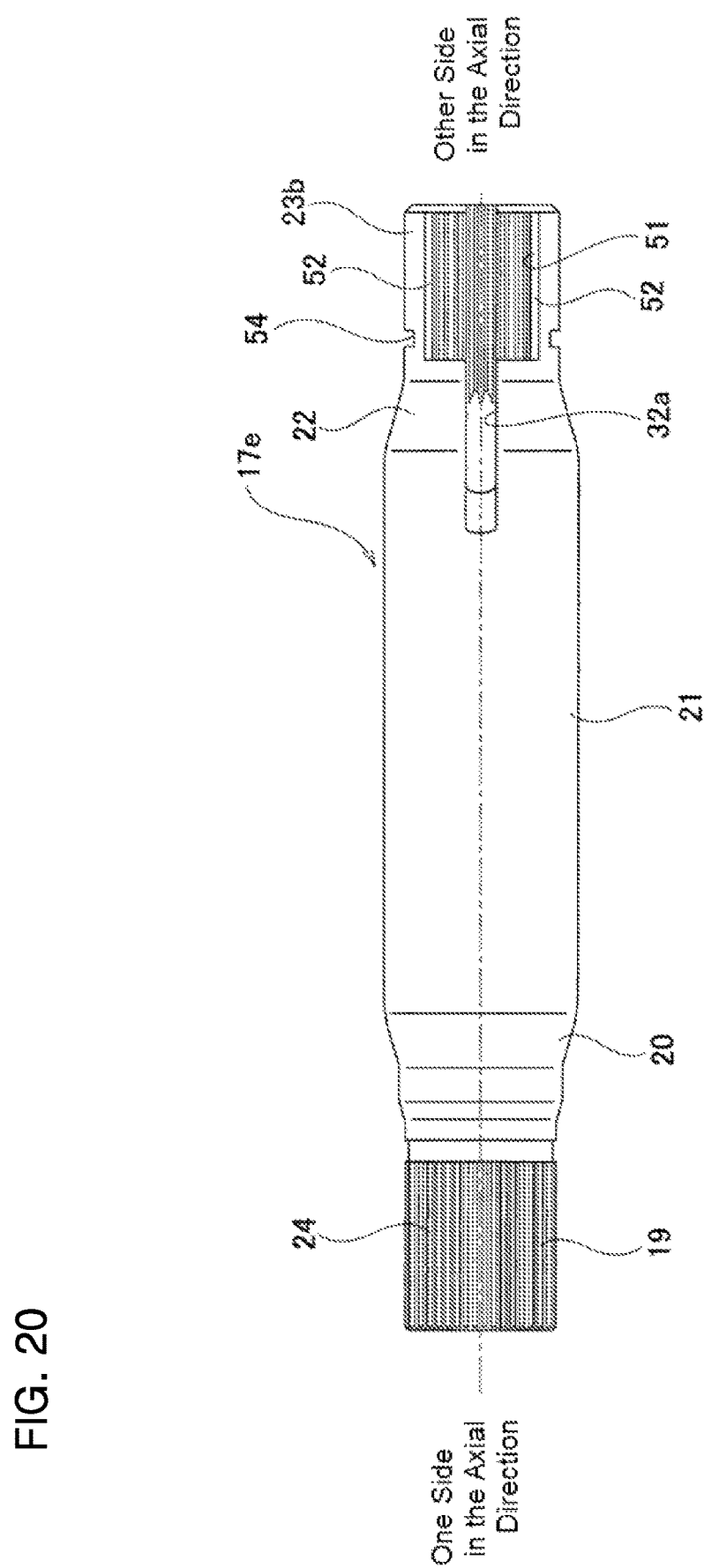
FIG. 20 is a diagram corresponding to FIG. 6 and illustrates a shaft of a torque transmission shaft according to a seventh example of an embodiment of the present invention.
Figure 21:
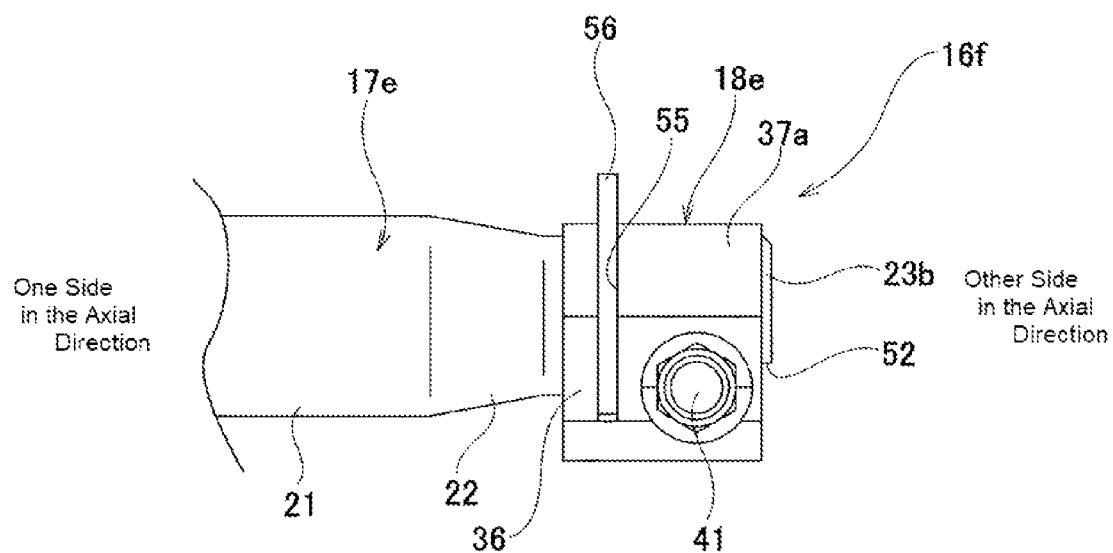
FIG. 21 is a diagram corresponding to the right-side portion of FIG. 1 and illustrates the torque transmission shaft according to the seventh example.

A seventh example of an embodiment of the present invention will be described with reference to FIGS. 20 and 21. The torque transmission shaft 16f of this example is a modification of the sixth example, and includes a locking concave groove 54 that extends in the circumferential direction on the outer circumferential surface of the one side portion in the axial direction of the fitting cylinder portion 23b of the outer circumferential surface of the shaft 17e. The locking concave groove 54 has a rectangular cross section, and the depth dimension that is constant over the entire length.

A locking slits 55 is provided on the one side portion in the axial direction of the clamp 18e that faces the locking concave groove 54 that is formed on the shaft 17e. The locking slit 55 is formed by moving a cutting tool (not illustrated) in a direction orthogonal to the center axis of the clamp 18e in a range from the top portion (upper end portion in FIG. 21) of the connecting portion 37a of the clamp 18e to an intermediate portion in the radial direction (intermediate portion in the vertical direction in FIG. 21) of the pair of flange portions 36, and the locking slit 55 make the inner and outer surfaces of the clamp 18e (the inner circumferential surface and the outer circumferential surface of the connecting portion 37a, and the inner side surface and the outer side surface in the width direction of the pair of flange portions 36) communicate with each other. The width dimension of the locking slit 55 is the same as the width dimension of the locking concave groove 54, and is slightly larger than the thickness dimension of a retaining ring 56 described later.

In this case as well, in a state in which the other end portion in the axial direction of the shaft 17e is inserted into the insertion hole 38c of the clamp 18e (see FIG. 19), and the clamp 18e is externally fitted onto the fitting cylinder portion 23b, the shaft-side engaging surface portion 52 and the clamp-side engaging surface portion 53 (see FIG. 19) are engaged (in contact) with each other in the circumferential direction to prevent the shaft 17e and the clamp 18e from rotating relative to each other. In other words, by engaging the shaft-side engaging surface portion 52 and the clamp-side engaging surface portion 53 with each other in the circumferential direction, a rotation locking portion is formed that prevents the relative rotation of the shaft 17e and the clamp 18e. Furthermore, a retaining ring 56, which is a locking member, is installed so as to span between the locking concave groove 54 and the locking slit 55.

The retaining ring 56 is an E-ring in the illustrated example, and by punching a metal plate made of an elastic material such as spring steel, stainless spring steel or the like by a press, is made into an incomplete annular shape having an opening portion at one location in the circumferential direction. The thickness dimension of the retaining ring 56 is slightly smaller than the width dimension of the locking concave groove 54 and the locking slit 55. The retaining ring 56 is elastically attached (externally fitted) to the locking concave groove 54 by locking the inner diameter side portion to the locking concave groove 54. A portion of the retaining ring 56 that protrudes outward in the radial direction from the locking concave groove 54 (intermediate portion in the radial direction) is arranged inside the locking slit 55 and engages with the clamp 18e in the axial direction. This prevents the shaft 17e and the clamp 18e from being displaced relative to each other in the axial direction. In the torque transmission shaft 16f of this example, the crimped deformed portion in the sixth example can be omitted. The other construction and effects are the same as in the first and sixth examples.

Eighth Example

Figure 22:
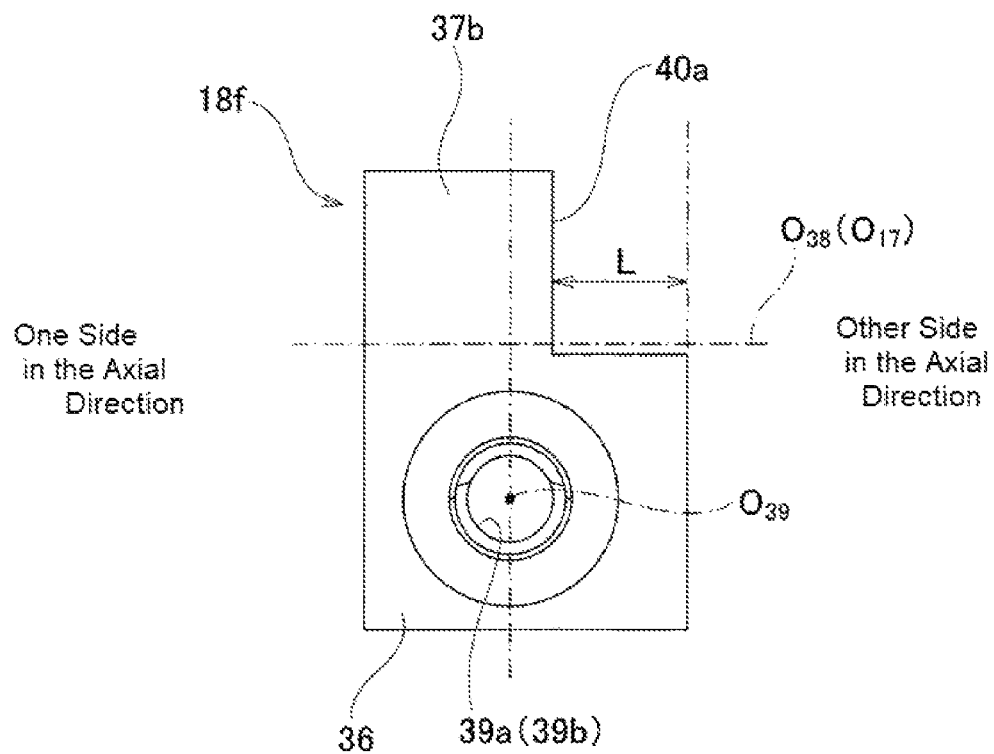
FIG. 22 is a diagram corresponding to FIG. 8B and illustrates a clamp of a torque transmission shaft according to an eighth example of an embodiment of the present invention.

An eighth example of an embodiment of the present invention will be described with reference to FIG. 22. In this example, only the shape of the clamp 18f that is externally fitted to the fitting cylinder portion 23 (see FIG. 1) of the shaft 17 is different from the structure of the first example. In other words, a notch 40a having a substantially rectangular shape when viewed from the axial direction of the mounting holes 39a, 39b is provided on the other side portion (half portion) in the axial direction of the connecting portion 37b of the clamp 18f. The width L in the axial direction of the notch 40a is constant in the circumferential direction of the connecting portion 37b. Therefore, the connecting portion 37b, when viewed from the axial direction of the mounting holes 39a, 39b, has a substantially rectangular shape in which the other half portion in the axial direction is cut off. The other end surface in the axial direction of the connecting portion 37b (the boundary position in the axial direction between the connecting portion 37b and the notch 40a) exists on a virtual plane parallel to the one end surface in the axial direction of the connecting portion 37b and orthogonal to the center axis $O_{38}$ of the insertion hole 38.

The notch 40a is located on the other side in the axial direction (right side in FIG. 22) from the center axis $O_{39}$ of the mounting holes 39a, 39b. More specifically, the edge on the one end in the axial direction of the notch 40b exists at substantially the same position in the axial direction as the edge on the other end in the axial direction of the mounting holes 39a, 39b. Moreover, the end portion of the notch 40a in the circumferential direction of the connecting portion 37b (the boundary position in the circumferential direction between the connecting portion 37b and the notch 40a) is arranged parallel to the center axis $O_{17}$ of the shaft 17, and is located on the side (bottom side in FIG. 22) nearer to the mounting holes 39a, 39b from the center axis $O_{17}$ of the shaft 17 in the direction orthogonal to both the center axis $O_{39}$ of the mounting holes 39a, 39b and the center axis $O_{17}$ of the shaft 17 (up-down direction in FIG. 22). In this example, of the other side portion in the axial direction of the fitting cylinder portion 23 (see FIG. 3), the portion located on the opposite side from the slit 32 in the radial direction (see FIG. 3) is exposed to the outside from the notch 40a in a wider range than in the case of the first example.

In this example, the formation range of the notch 40a is larger than that in the first example, and therefore the tightening force from the clamp 18f acting on the other side portion in the axial direction of the fitting cylinder portion 23, which has low rigidity, can be made smaller, The other construction and effects are the same as in the first example.

Ninth Example

Figure 23:
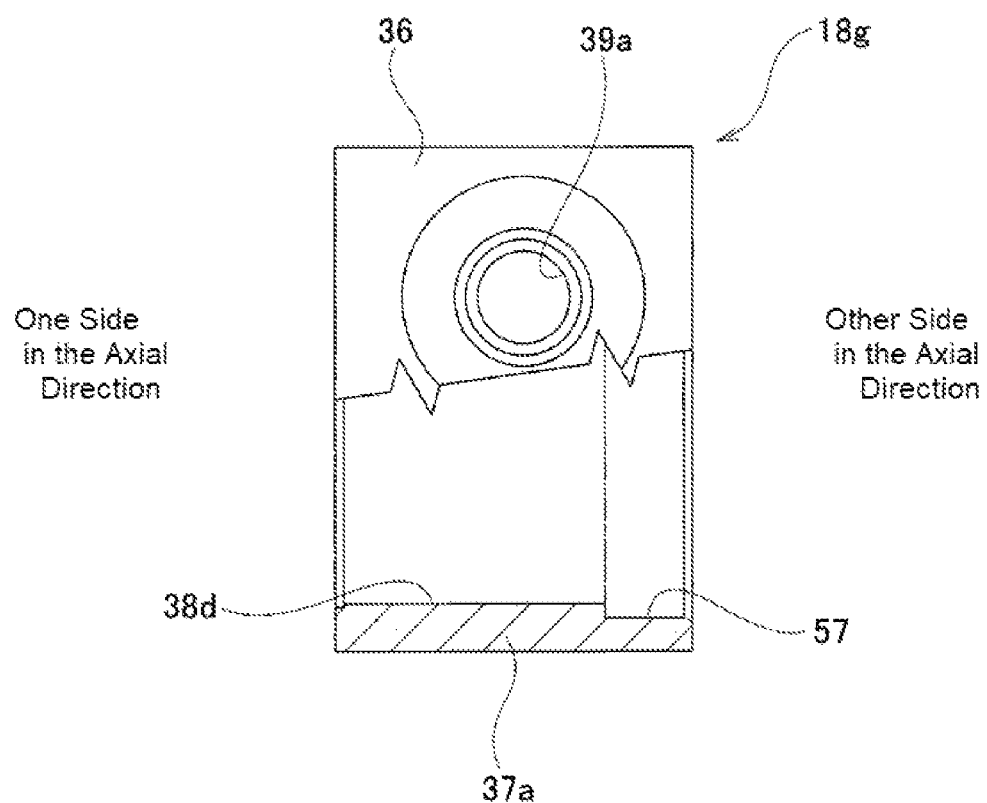
FIG. 23 is a partial cross-sectional side view of a clamp of a torque transmission shaft according to a ninth example of an embodiment of the present invention.

A ninth example of an embodiment of the present invention will be described with reference to FIGS. 23 to 25. The torque transmission shaft 16g of this example has an annular concave groove 57 on the inner circumferential surface of the other end portion in the axial direction of the insertion hole 38d of the clamp 18g, the concave groove 57 having an inner diameter dimension that is larger than the portion adjacent on the one side in the axial direction, or in other words, is recessed outward in the radial direction. Therefore, the inner circumferential surface of the insertion hole 38d has a stepped cylindrical surface shape. The annular concave groove 57 opens at the edge of the other end in the axial direction of the clamp 18g and at the discontinuous portion 35 (see FIG. 4). The annular concave groove 57 is arranged over the entire circumference of the insertion hole 38d. The depth dimension of the annular concave groove 57 is constant in the circumferential and axial directions. The dimension in the axial direction of the annular concave groove 57 is constant in the circumferential direction, and is about ⅙ to ⅓ of the dimension in the axial direction of the clamp 18g (about ⅕ in the illustrated example). Note that the inner circumferential surface of the insertion hole 38d includes the inner circumferential surface of the connecting portion 37a and inner surface in the radial direction of the pair of flange portions 36, and thus a part of the annular concave groove 57 is arranged on the inner circumferential surface of the connecting portion 37a and the inner surface in the radial direction of the pair of flange portions 36.

Figure 24:
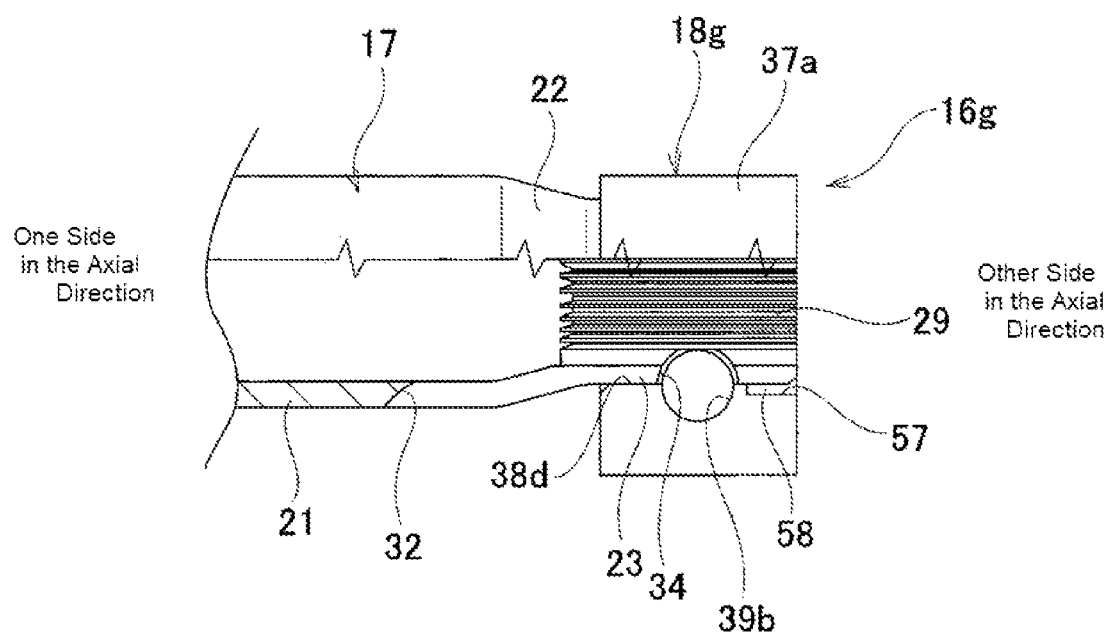
FIG. 24 is a cross-sectional view of the torque transmission shaft according to the ninth example in a state before the diameter of a shaft of the torque transmission shaft is reduced.
Figure 25:
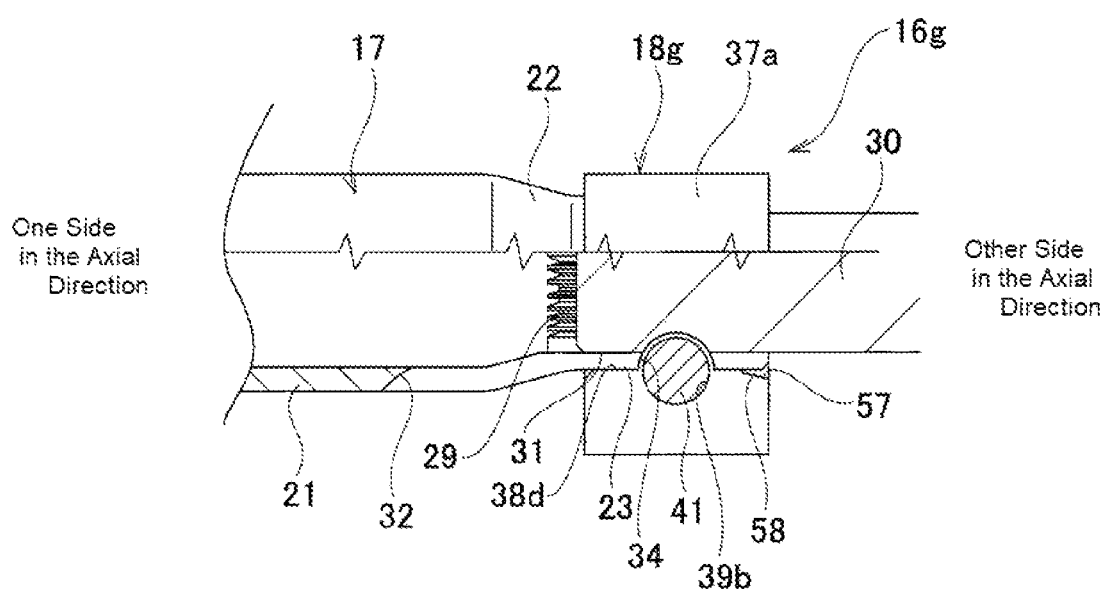
FIG. 25 is a cross-sectional view of the torque transmission shaft according to the ninth embodiment and a shaft connected to the torque transmission shaft in a state after the diameter of the shaft of the torque transmission shaft is reduced.

As illustrated in FIG. 24, in a state where the clamp 18g is externally fitted to the fitting cylinder portion 23 and before the diameter of the fitting cylinder portion 23 is reduced by the clamp 18g, the one side portion in the axial direction, or in other words, the outer circumferential surface of from the one end portion to the intermediate portion in the axial direction of the fitting cylinder portion 23, and the one side portion in the axial direction, or in other words, the inner circumferential surface of from the one end portion to the intermediate portion in the axial direction of the insertion hole 38d are in contact with each other over the entire circumference. On the other hand, an annular gap 58 having a substantially rectangular cross section exists between the outer circumferential surface of the other end portion in the axial direction of the fitting cylinder portion 23 and the inner circumferential surface (the bottom portion of the annular concave groove 57) of the other end portion in the axial direction of the insertion hole 38d. In other words, in a state where the clamp 18g is externally fitted over the fitting cylinder portion 23 and before the diameter of the fitting cylinder portion 23 is reduced by the clamp 18g, the one side portion in the axial direction of the insertion hole 38d of the clamp 18g is composed of a small diameter portion having an inner diameter dimension equal to or slightly larger than the outer diameter dimension of the fitting cylinder portion, and the other end portion in the axial direction of the insertion hole 38d of the clamp 18g is composed of a large diameter portion having an inner diameter dimension larger than the inner diameter dimension of the one side portion in the axial direction of the insertion hole 38d of the clamp 18g. In FIG. 24, the depth dimension of the annular concave groove 57 is exaggerated. The actual depth dimension of the annular concave groove 57 is such that in a state where the clamp 18g is externally fitted over the fitting cylinder portion 23 and before the diameter of the fitting cylinder portion 23 is reduced by the clamp 18g, the dimension in the radial direction of the annular gap 58 is set to be about several tens of μm to 500 μm.

In this example, when the diameter of the fitting cylinder portion 23 is reduced by the clamp 18g, the bottom portion of the annular concave groove 57 comes into contact with the outer circumferential surface of the fitting cylinder portion 23 gradually from the one side in the axial direction to the other side in the axial direction as the diameter is reduced. Therefore, in the process of reducing the diameter of the fitting cylinder portion 23 by the clamp 18g, a state occurs in which the outer circumferential surface of from the one end portion to the intermediate portion in the axial direction of the fitting cylinder 23 and the inner circumferential surface of from the one end portion to the intermediate portion in the axial direction of the insertion hole 38d come into contact with each other, and an annular gap 58 exists between the outer circumferential surface of the other end portion in the axial direction of the fitting cylinder 23 and the inner circumferential surface of the other end portion in the axial direction of the insertion hole 38d. Finally, as illustrated in FIG. 25, a state occurs in which the annular gap 58 or a part thereof remains between the other side portion in the axial direction of the bottom portion of the annular concave groove 57 and the outer circumferential surface of the fitting cylinder portion 23, or the entire bottom portion of the annular concave groove 57 comes in contact with the outer circumferential surface of the fitting cylinder portion 23 causing the annular gap 58 to completely disappear.

In any case, a large tightening force can be applied from the clamp 18g to the one side portion in the axial direction of the fitting cylinder portion 23 having high rigidity. Moreover, the tightening force applied from the clamp 18g to the other side portion in the axial direction of the fitting cylinder portion 23 having low rigidity can be made smaller than that in the case where the annular concave groove 57 is not provided. Therefore, when the diameter of the fitting cylinder portion 23 is reduced by the clamp 18g, the amount of deformation generated in the fitting cylinder portion 23 on both the one side portion in the axial direction and the other side portion in the axial direction can be brought close to each other. Accordingly, the surface pressure between the inner circumferential surface of the fitting cylinder portion 23 and the outer circumferential surface of the shaft 30 can be brought close to each other between the one side portion in the axial direction and the other side portion in the axial direction. As a result, it is possible to suppress the occurrence of precession in the shaft 30 connected to the other end portion in the axial direction of the shaft 17. Therefore, it is possible to suppress fretting wear from occurring in the serration engagement portion between the female serration 29 and the male serration 31. As a result, it is possible to prevent the looseness between the shaft 17 and the shaft 30, and it is also possible to prevent the generation of abnormal noise due to the looseness. The other construction and effects are the same as in the first example.

Tenth Example

Figure 26:
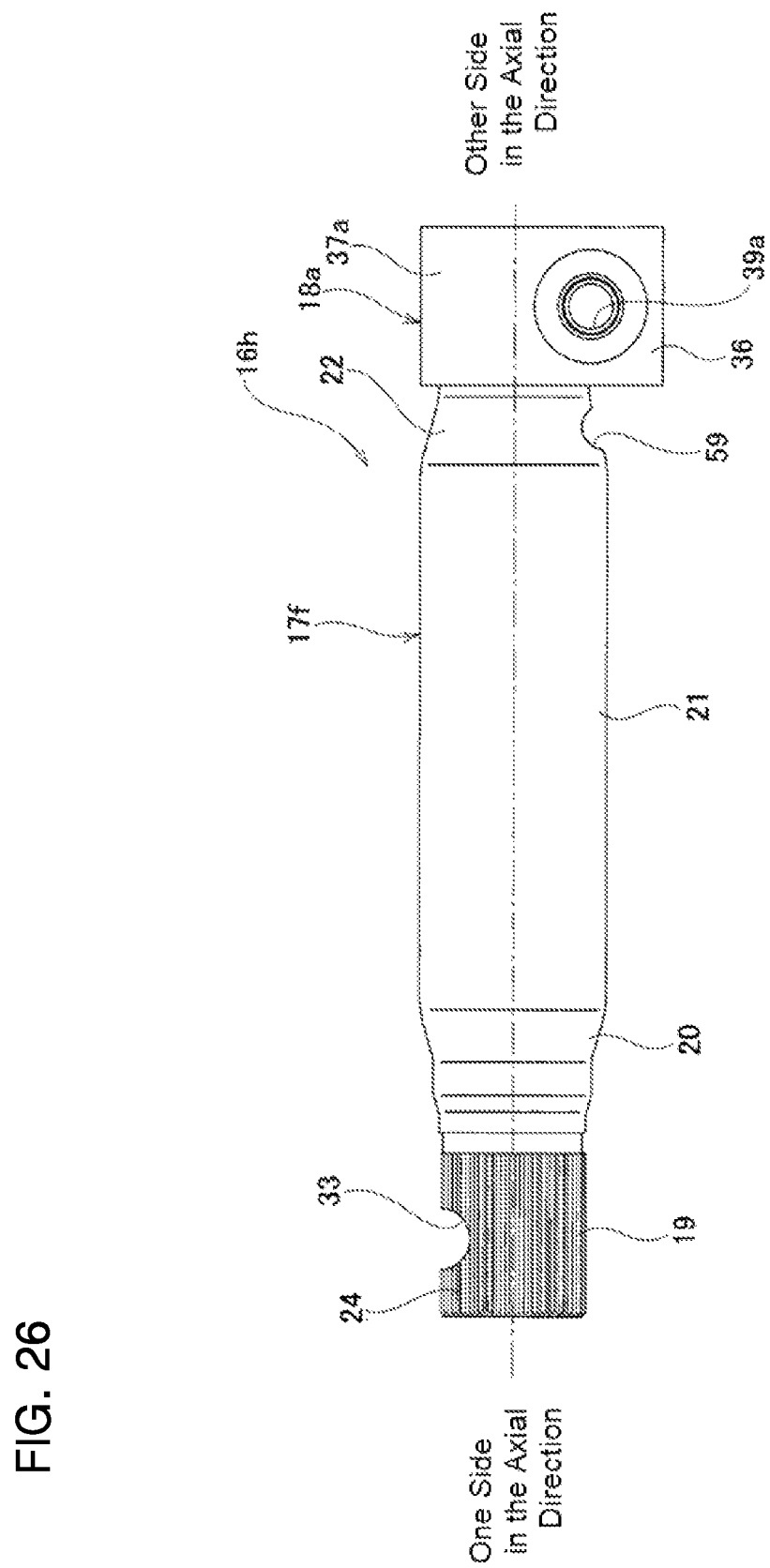
FIG. 26 is a diagram corresponding to FIG. 1 and illustrates a torque transmission shaft according to a tenth example of an embodiment of the present invention.
Figure 27:
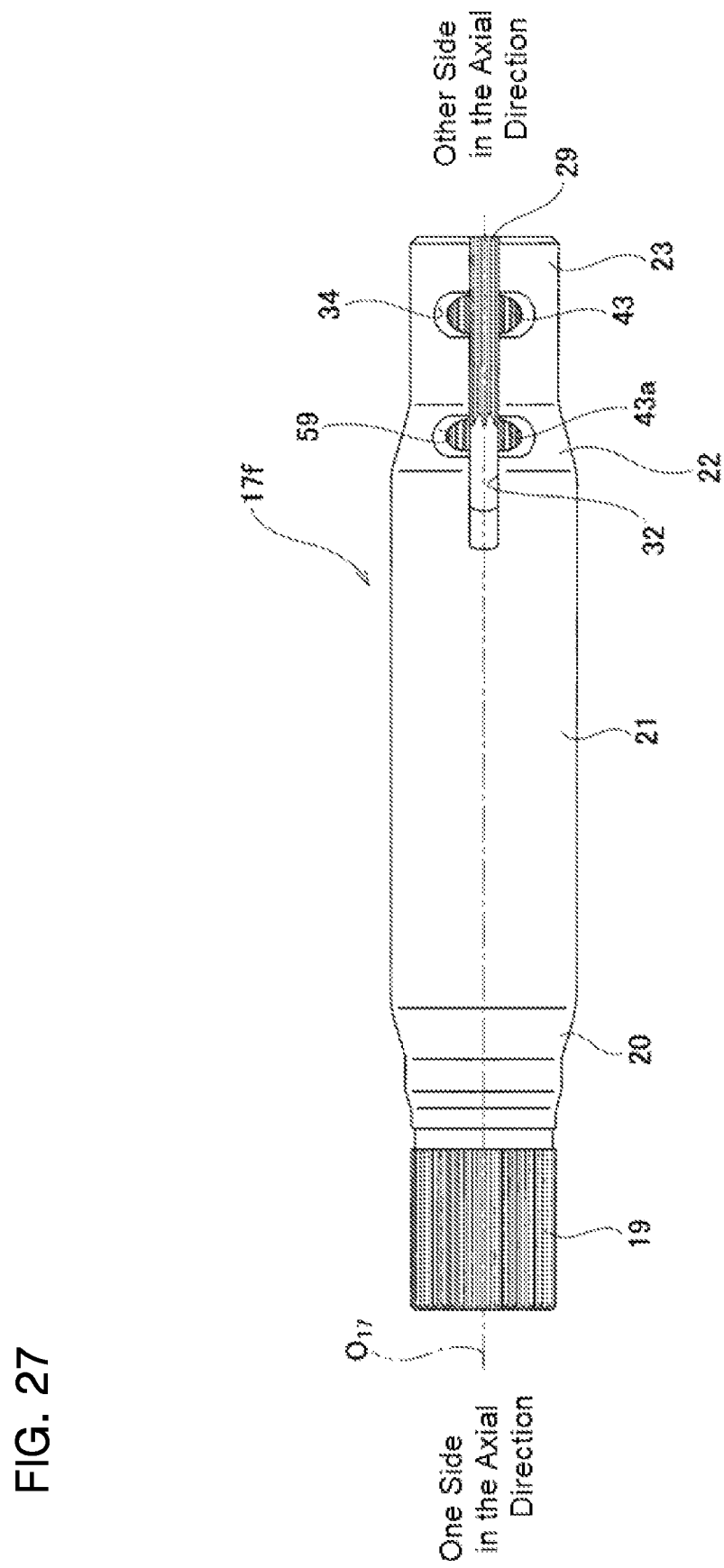
FIG. 27 is a diagram corresponding to FIG. 6 and illustrates a shaft of the torque transmission shaft according to the tenth example.
Figure 28:
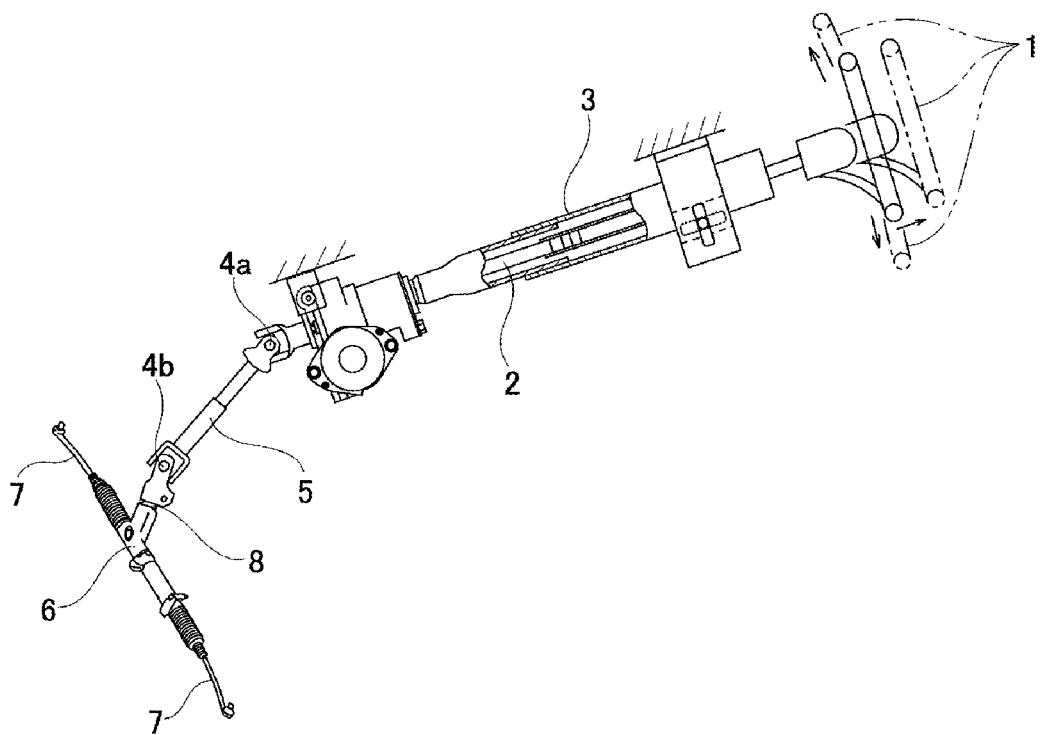
FIG. 28 is a partial cross-sectional side view of a conventional steering apparatus.
Figure 29:
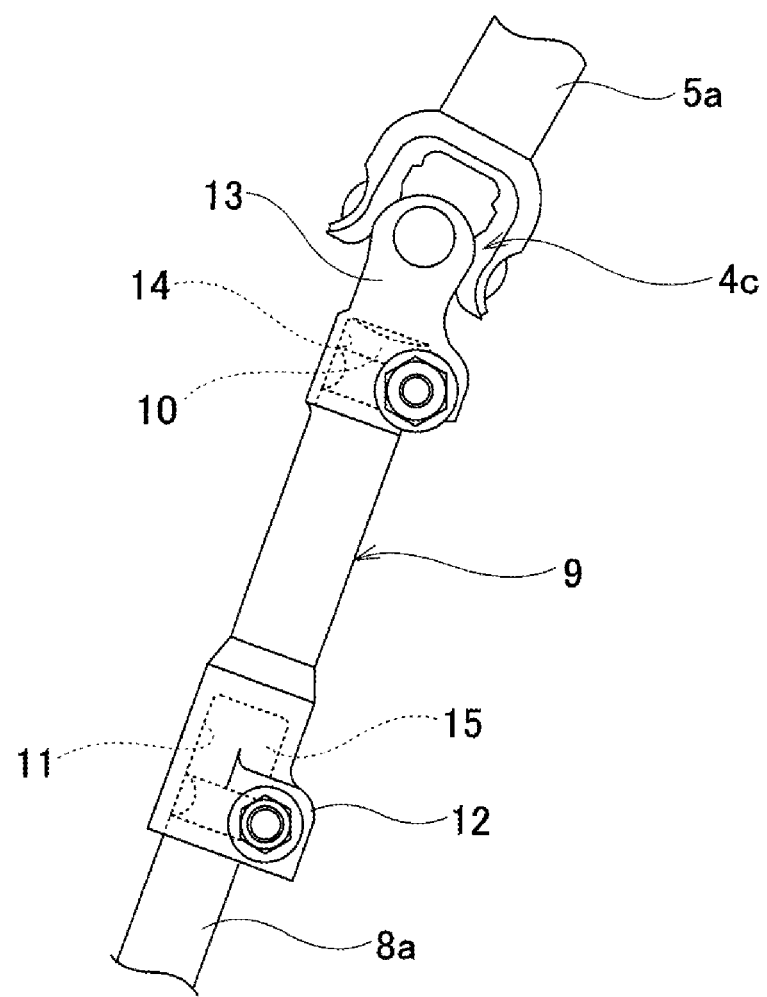
FIG. 29 is a diagram illustrating of a torque transmission shaft having a conventional structure in a state in which a universal joint and a pinion shaft are connected to the torque transmission shaft.
Figure 30:
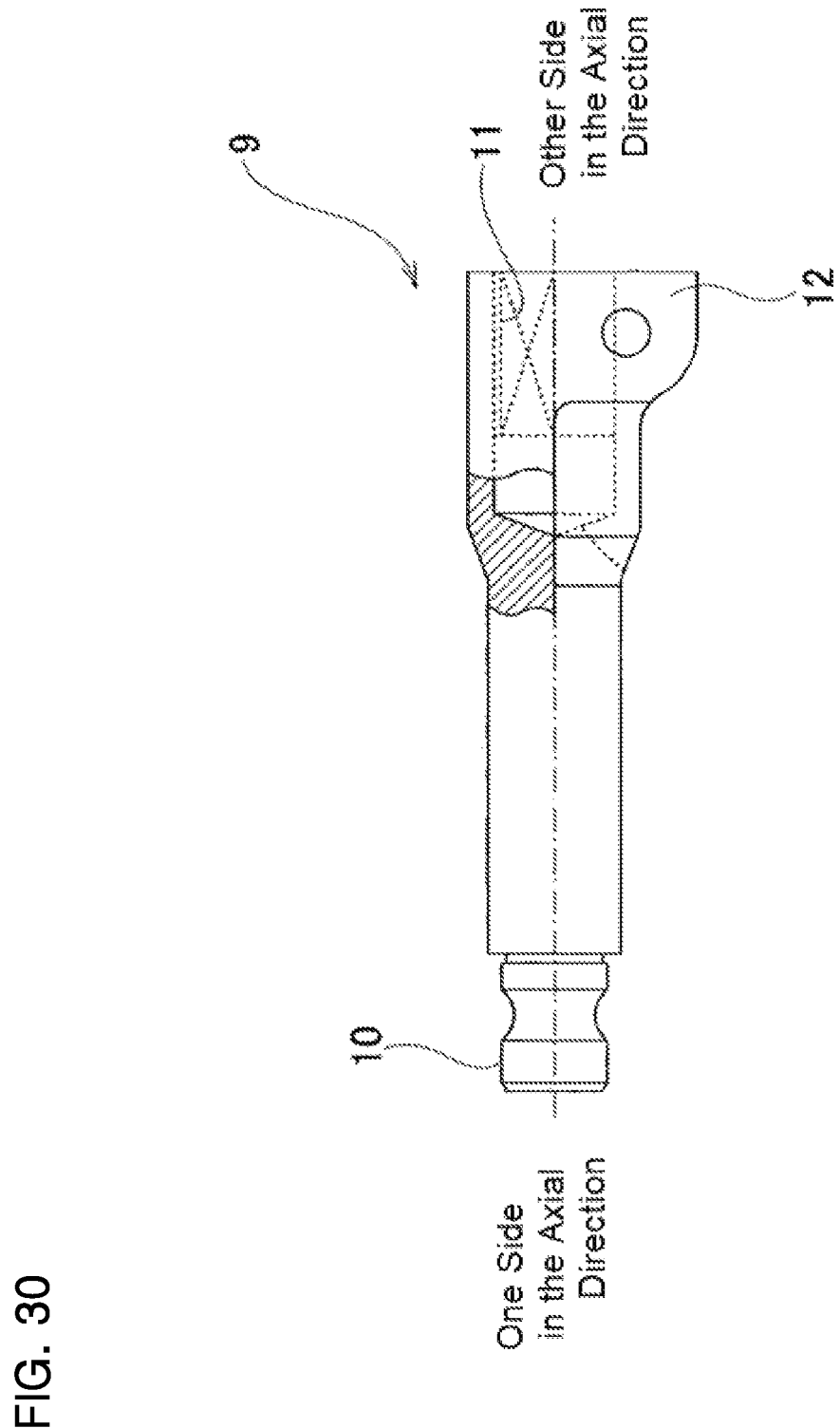
FIG. 30 is a partial cross-sectional side view of a torque transmission shaft having a conventional structure.

A tenth example of an embodiment of the present invention will be described with reference to FIGS. 26 and 27. The torque transmission shaft 16h of this example includes an auxiliary concave groove 59 on the circumferential surface of the shaft 17f in a part in the circumferential direction of the outer circumferential surface of the fitting side conical cylinder portion 22 that is separated to the one side in the axial direction from the fitting cylinder portion 23. The auxiliary concave groove 59 has a phase in the circumferential direction that coincides with the fitting side engaging concave groove 34, and is arranged in parallel with the fitting side engaging concave groove 34. The auxiliary concave groove 59 is arranged so as to intersect the intermediate portion in the axial direction (or the other side portion in the axial direction) of the slit 32. The intersection of the auxiliary concave groove 59 and the slit 32 is also a wide portion 43a in which the width dimension of the opening portion is larger than that of the portions of the slit 32 that are adjacent to both sides in the axial direction of the intersection. Therefore, the slit 32 has wide portions 43, 43a with wide openings in the circumferential direction that are located at two positions: the other side portion in the axial direction that intersects the fitting side engaging concave groove 34, and the intermediate portion in the axial direction that intersects the auxiliary concave groove 59, respectively.

The auxiliary concave groove 59 is composed of a broach groove formed by broaching, and is processed at the same time as the fitting side engaging concave groove 34. More specifically, by simultaneously moving two broaching tools (not illustrated), which are arranged in a direction orthogonal to the center axis $O_{17}$ of the shaft 17f and parallel to each other, in the axial direction of the broaching tools (front-rear direction in FIG. 26, and up-down direction in FIG. 27), on the outer circumferential surface of the shaft 17f, the fitting side engaging concave groove 34 is formed on the outer circumferential surface of the fitting cylinder portion 23, and the auxiliary concave groove 59 is formed on the outer circumferential surface of the fitting side conical cylinder portion 22. The auxiliary concave groove 59 has a partially cylindrical surface shape, and the radius of curvature of the auxiliary concave groove 59 is determined according to the relation to the magnitude of the rigidity of the other side portion in the axial direction of the shaft 17f, and in the illustrated example, the radius of curvature is the same as the radius of curvature of the fitting side engaging concave groove 34. In this example, the fitting side engaging concave groove 34 and the auxiliary concave groove 59 are machined at the same time; however, the fitting side engaging concave groove 34 and the auxiliary concave groove 59 can be machined in order. Even in a case of machining the fitting side engaging concave groove 34 and the auxiliary concave groove 59 in order, the fitting side engaging concave groove 34 and the auxiliary concave groove 59 are arranged in parallel, and thus the fitting side engaging concave groove 34 and the auxiliary concave groove 59 can be machined in order without re-chucking the workpiece to the broaching machine, and therefore the processing cost can be suppressed.

In this example, by providing the auxiliary concave groove 59 on the outer circumferential surface of the shaft 17f so as to intersect the slit 32 on a portion separated from the fitting cylinder portion 23 on the one side in the axial direction, the wall thickness is reduced (material is removed), and a wide portion 43a having an opening extending in the circumferential direction is provided at the intersection with the slit 32. Therefore, the rigidity of the one side portion in the axial direction of the fitting cylinder portion 23 near the closed end of the slit 32 can be reduced. As a result, the rigidity of the fitting cylinder portion 23 on both the one side portion in the axial direction and the other side portion in the axial direction can be brought close to each other, and thus when reducing the diameter of the fitting cylinder portion 23, the amount of deformation generated in the fitting cylinder portion 23 on both the one side portion in the axial direction and the other side portion in the axial direction can be brought close to each other. Accordingly, the surface pressure between the inner circumferential surface of the fitting cylinder portion 23 and the outer circumferential surface of the shaft 30 (see FIG. 9) on both the one side portion in the axial direction and the other side portion in the axial direction can be brought close to each other. As a result, it is possible to suppress the occurrence of precession in the shaft 30 connected to the other end portion in the axial direction of the shaft 17f. Therefore, it is possible to suppress fretting wear from occurring in the serration engagement portion between the female serration 29 and the male serration 31 (see FIG. 9). As a result, it is possible to prevent the looseness between the shaft 17 and the shaft 30, and it is also possible to prevent the generation of abnormal noise due to the looseness.

In this example, the fitting side engaging concave groove 34 and the auxiliary concave groove 59 are used as a broaching groove formed by broaching, and the fitting side engaging concave groove 34 and the auxiliary concave groove 59 are processed at the same time. Therefore, it is possible to minimize an increase in processing man-hours (number of steps) caused by forming the auxiliary concave groove 59. Accordingly, it is possible to suppress an increase in the processing cost of the torque transmission shaft 16h. The other construction and effects are the same as in the first example.

In a case of implementing the present invention, the construction of the examples of embodiments of the present invention can be appropriately combined and carried out. In a case of implementing the present invention, protrusions protruding inward in the radial direction are provided at one or a plurality of positions on the inner circumferential surface of the insertion hole of the clamp, and by making the tip end portion of the protrusions bite into the outer circumferential surface of the shaft, it is possible to prevent relative rotation between the shaft and the clamp. Moreover, missing tooth portions (cylindrical surface portions) in which female serrations are not formed can be provided on portions of the inner circumferential surface of the fitting cylinder portion adjacent to both sides of the slit in the circumferential direction. In this case, when the diameter of the fitting cylinder portion is reduced, it is possible to prevent the female serrations from locally hitting the male serrations formed on the outer circumferential surface of the shaft. In a case of implementing the present invention, the position in the circumferential direction of the slit provided in the shaft is not limited to the position indicated in each of the above examples. The number of slits is also not limited to one, and a plurality of slits may be provided. In a case where a stress relaxation portion is formed at the back-end portion of the slit, any shape such as an elliptical shape, a drop shape or the like can be adopted as the shape of the stress relaxation portion. Each of a pair of mounting holes provided in the clamp can be used as a through hole in combination with a nut. Furthermore, the shaft and the clamp can be fixed together by press-fitting (light press-fitting) the fitting cylinder portion of the shaft into the insertion hole of the clamp.

REFERENCE SIGNS LIST

1 Steering wheel
2 Steering shaft
3 Steering column
4a, 4b, 4c Universal joint
5, 5a Intermediate shaft
6 Steering gear unit
7 Tie rod
8, 8a Pinion shaft
9 Torque transmission shaft
10 Male serration
11 Non-circular hole
12 Clamp portion
13 Yoke
14 Female serration
15 Non-circular shaft portion
16, 16a to 16h Torque transmission shaft
17, 17a to 17f Shaft
18, 18a to 18g Clamp
19 Insertion cylinder portion
20 Insertion side conical cylinder portion
21 Large diameter cylinder portion
22 Fitting side conical cylinder portion
23, 23a, 23b Fitting cylinder portion
24 Male serration
25 Universal joint
26 Yoke
27 Base portion
28 Female serration
29 Female serration
30 Shaft
31 Male serration
32 Slit
33 Insertion side engaging concave groove
34 Fitting side engaging concave groove
35 Discontinuous portion
36 Flange portion
37, 37a, 37b Connecting portion
38, 38a to 38d Insertion hole
39a, 39b Mounting hole
40, 40a Notch
41 Tightening bolt
42 Circumferential concave groove
43, 43a Wide portion
44 Stepped surface
45 Welded portion
46 Shaft-side flat surface portion
47 Clamp-side flat portion
48 Shaft-side engaging portion
49 Clamp-side engaging portion
50, 50a Crimped deformed portion
51 Wide portion
52 Shaft-side engaging surface portion
53 Clamp-side engaging surface portion
54 Locking concave groove
55 Locking slit
56 Retaining ring
57 Annular concave groove
58 Annular gap
59 Auxiliary concave groove

The invention claimed is:

1. A torque transmission shaft, comprising:
a shaft having a hollow cylindrical shape and including: a male serration provided on an outer circumferential surface of one end portion in an axial direction; a slit provided in the other end portion in the axial direction, extending in the axial direction, and having a closed end on one side in the axial direction and an open end on the other side in the axial direction; a fitting cylinder portion provided in the other end portion in the axial direction; and a female serration provided on an inner circumferential surface of the other end portion in the axial direction;
and a clamp having an incomplete cylindrical shape and including: a discontinuous portion arranged at one place in a circumferential direction; a pair of flange portions arranged on both sides in the circumferential direction of the discontinuous portion and having mounting holes into which a tightening member can be inserted; a connecting portion having a partially cylindrical shape and connecting the pair of flange portions in the circumferential direction; and an insertion hole into which the fitting cylinder portion is inserted;
wherein the clamp is externally fitted onto the fitting cylinder portion and is able to reduce a diameter of the fitting cylinder portion by narrowing a width dimension of the discontinuous portion,
wherein the female serration is provided only on an inner circumferential surface of the fitting cylinder portion, and one end portion in the axial direction of the slit is located on the one side in the axial direction from the fitting cylinder portion, and is located at a portion having an outer diameter dimension and an inner diameter dimension larger than the fitting cylinder portion, and
wherein the shaft has a conical cylinder portion in a portion adjacent to the one side in the axial direction of the fitting cylinder portion having an outer diameter dimension and inner diameter dimension that become larger as going toward the one side in the axial direction, and the one end portion in the axial direction of the slit is located on the one side in the axial direction from the conical cylinder portion.

2. The torque transmission shaft according to claim 1, wherein positions in the circumferential direction of the slit and the discontinuous portion coincide with each other.

3. The torque transmission shaft according to claim 1, wherein the shaft and the clamp are welded and fixed together.

4. The torque transmission shaft according to claim 1, wherein an outer circumferential surface of the fitting cylinder portion and an inner circumferential surface of the insertion hole are fitted together with a non-circular fit so as to not rotate relative to each other.

5. The torque transmission shaft according to claim 1, wherein the shaft and the clamp are configured so that an amount of deformation that occurs in the fitting cylinder portion in a case where the diameter of the fitting cylinder portion of the clamp is reduced by the clamp is similar between one side portion in the axial direction and the other side portion in the axial direction of the fitting cylinder portion.

6. The torque transmission shaft according to claim 1, wherein the connecting portion includes a notch that is provided on a portion on the other side in the axial direction, and is recessed on the one side in the axial direction from an end surface on the other side in the axial direction of the pair of flange portions.

7. The torque transmission shaft according to claim 1,
wherein in a state before the diameter of the shaft is reduced by the clamp, an outer circumferential surface of one side portion in the axial direction of the fitting cylinder portion and an inner circumferential surface of one side portion in the axial direction of the insertion hole are substantially in contact with each other, and an annular gap is provided between the outer circumferential surface of the other end portion in the axial direction of the fitting cylinder and an inner circumferential surface of the other end portion in the axial direction of the insertion hole.

8. The torque transmission shaft according to claim 1,
wherein in a state before the diameter of the shaft is reduced by the clamp, a portion on the one side in the axial direction of the insertion hole of the clamp is composed of a small diameter portion having an inner diameter dimension that is equal to or slightly larger than an outer diameter dimension of the fitting cylinder portion, and the other end portion in the axial direction of the insertion hole of the clamp is composed of a large diameter portion having an inner diameter dimension that is larger than an inner diameter dimension of one side portion in the axial direction of the insertion hole of the clamp.

9. A torque transmission shaft, comprising:
a shaft having a hollow cylindrical shape and including: a male serration provided on an outer circumferential surface of one end portion in an axial direction; a slit provided in the other end portion in the axial direction, extending in the axial direction, and having a closed end on one side in the axial direction and an open end on the other side in the axial direction; a fitting cylinder portion provided in the other end portion in the axial direction; and a female serration provided on an inner circumferential surface of the other end portion in the axial direction;
and a clamp having an incomplete cylindrical shape and including: a discontinuous portion arranged at one place in a circumferential direction; a pair of flange portions arranged on both sides in the circumferential direction of the discontinuous portion and having mounting holes into which a tightening member can be inserted; a connecting portion having a partially cylindrical shape and connecting the pair of flange portions in the circumferential direction; and an insertion hole into which the fitting cylinder portion is inserted;
wherein the clamp is externally fitted onto the fitting cylinder portion and is able to reduce a diameter of the fitting cylinder portion by narrowing a width dimension of the discontinuous portion,
wherein the connecting portion includes a notch that is provided on a portion on the other side in the axial direction, and is recessed on the one side in the axial direction from an end surface on the other side in the axial direction of the pair of flange portions, and
wherein the notch has an edge on the one end in the axial direction which is located on the other side in the axial direction from a center axis of the mounting holes and on the one side in the axial direction from an edge on the other end in the axial direction of the mounting holes.

10. The torque transmission shaft according to claim 9, wherein the shaft includes: a fitting side engaging concave groove that is provided on a part in the circumferential direction of an outer circumferential surface of the fitting cylinder portion so as to intersect the slit, and so that the tightening member can be arranged therein; and an auxiliary concave groove that is provided in a part in the circumferential direction of an outer circumferential surface of a portion separated to the one side in the axial direction from the fitting cylinder portion so as to intersect the slit.

11. A torque transmission shaft, comprising:
a shaft having: a male serration provided on an outer circumferential surface of one end portion in an axial direction; a slit provided in the other end portion in the axial direction, extending in the axial direction, and having a closed end on one side in the axial direction and an open end on the other side in the axial direction; a fitting cylinder portion provided in the other end portion in the axial direction; and a female serration provided on an inner circumferential surface of the other end portion in the axial direction;
and a clamp having: a discontinuous portion arranged at one place in a circumferential direction; a pair of flange portions arranged on both sides in the circumferential direction of the discontinuous portion and having mounting holes into which a tightening member can be inserted; a connecting portion configured to connect the pair of flange portions in the circumferential direction; and an insertion hole into which the fitting cylinder portion is inserted;
wherein the clamp is externally fitted onto the fitting cylinder portion and is able to reduce a diameter of the fitting cylinder portion by narrowing a width dimension of the discontinuous portion, and
wherein the connecting portion includes a notch that is provided on a portion on the other side in the axial direction, and is recessed on the one side in the axial direction from an end surface on the other side in the axial direction of the pair of flange portions, and
wherein the notch has an edge on the one end in the axial direction which is located on the other side in the axial direction from a center axis of the mounting holes and on the one side in the axial direction from an edge on the other end in the axial direction of the mounting holes.

12. The torque transmission shaft according to claim 11, wherein the shaft includes: a fitting side engaging concave groove that is provided on a part in the circumferential direction of an outer circumferential surface of the fitting cylinder portion so as to intersect the slit, and so that the tightening member can be arranged therein; and an auxiliary concave groove that is provided in a part in the circumferential direction of an outer circumferential surface of a portion separated to the one side in the axial direction from the fitting cylinder portion so as to intersect the slit.

13. The torque transmission shaft according to claim 11, wherein the female serration is provided only on an inner circumferential surface of the fitting cylinder portion, and one end portion in the axial direction of the slit is located on the one side in the axial direction from the fitting cylinder portion, and is located at a portion having an outer diameter dimension and an inner diameter dimension larger than the fitting cylinder portion.

14. The torque transmission shaft according to claim 13, wherein the shaft has a conical cylinder portion in a portion adjacent to the one side in the axial direction of the fitting cylinder portion having an outer diameter dimension and inner diameter dimension that become larger as going toward the one side in the axial direction, and the one end portion in the axial direction of the slit is located on the one side in the axial direction from the conical cylinder portion.

15. The torque transmission shaft according to claim 11, wherein positions in the circumferential direction of the slit and the discontinuous portion coincide with each other.

16. The torque transmission shaft according to claim 11, wherein the shaft and the clamp are welded and fixed together.

17. The torque transmission shaft according to claim 11, wherein the shaft and the clamp are fixed together by a plastically deformed portion formed on at least one of the shaft and the clamp.

18. The torque transmission shaft according to claim 11, wherein the shaft and the clamp are configured so that an amount of deformation that occurs in the fitting cylinder portion in a case where the diameter of the fitting cylinder portion of the clamp is reduced by the clamp is similar between one side portion in the axial direction and the other side portion in the axial direction of the fitting cylinder portion.

* * * * *